United States Patent
Kurachi et al.

[19]

[11] Patent Number: 6,092,035
[45] Date of Patent: Jul. 18, 2000

[54] SERVER DEVICE FOR MULTILINGUAL TRANSMISSION SYSTEM

[75] Inventors: Atsuhiko Kurachi, Komaki; Sunao Kawai, Toyoake; Norihisa Fujii, Tokoname, all of Japan

[73] Assignee: Brothers Kogyo Kabushiki Kaisha, Nagoya, Japan

[21] Appl. No.: 08/984,293

[22] Filed: Dec. 3, 1997

[30] Foreign Application Priority Data

Dec. 3, 1996 [JP] Japan .................................. 8-322842
Feb. 10, 1997 [JP] Japan .................................. 9-026343
Feb. 18, 1997 [JP] Japan .................................. 9-033708

[51] Int. Cl.$^7$ ...................................................... G06F 17/28
[52] U.S. Cl. ...................................................... 704/3; 704/9
[58] Field of Search ............................. 704/1–9; 707/536

[56] References Cited

U.S. PATENT DOCUMENTS

| | | | |
|---|---|---|---|
| 4,703,425 | 10/1987 | Muraki ........................................ | 704/2 |
| 5,418,717 | 5/1995 | Su et al. ...................................... | 704/9 |
| 5,477,450 | 12/1995 | Takeda et al. ............................... | 704/2 |
| 5,490,061 | 2/1996 | Tolin et al. .................................. | 704/2 |
| 5,523,946 | 6/1996 | Kaplan et al. ............................... | 704/2 |
| 5,535,120 | 7/1996 | Chong et al. ............................... | 704/2 |
| 5,787,386 | 7/1998 | Kaplan et al. ............................... | 704/2 |

OTHER PUBLICATIONS

"Report Relating to Development of Language Processing Systems and Research Relating to Systems for Quickly Reporting Japanese–English Scientific Technological Documents" Kyoto University, Electrotechnical Laboratory, pp. 22–27, pp. 139–143, pp. 191–197.

*Primary Examiner*—Forester W. Isen
*Assistant Examiner*—Patrick N. Edouard
*Attorney, Agent, or Firm*—Oliff & Berridge, PLC

[57] ABSTRACT

A multilingual transmission system includes a server device and a client device. The server device analyzes the meaning and grammatical significance of a source text in a natural language. When vagueness exists in the source text, the server device displays different candidates corresponding to different interpretations of the vague source text, so that the user can select which interpretation is correct. The server device produces pivot language data accordingly and stores it. When the client device requests text data, the server device retrieves pivot language data corresponding to the requested text data. Based on the retrieved pivot language data, the server device generates target language text data in the language requested by the client device and transmits the generated target language text data to the client device. When the client device sands a key word to the server device, the server device converts the key word into a pivot language expression and searches for pivot language data containing the pivot language expression. When the server device finds pivot language data that contains the pivot language expression, the server device converts the pivot language data into the target language or the language of the key word and sands it to the client device.

24 Claims, 21 Drawing Sheets

FIG. 6 (a)

```
GET<TEXT IDENTIFICATION INFORMATION><VERSION INFORMATION><CRLF>
<VARIOUS HEADER INFORMATION>
Accept-Language:<REQUESTED LANGUAGE><CRLF>
<CRLF>
<CRLF>
```

FIG. 6 (b)

```
GET /pub/sample.html   HTTP/1.0<CRLF>
Accept-Language:jp<CRLF>
<CRLF>
<CRLF>
```

SOURCE TEXT

私は林檎をゆっくり食べる

(I EAT AN APPLE SLOWLY.)

RESULTS OF MORPHOLOGICAL ANALYSIS

| 私 | は | 林檎 | を | ゆっくり | 食べる |
|---|---|---|---|---|---|
| (I) | | (APPLE) | | (SLOWLY) | (EAT) |
| (NOUN) | (JAPANESE PARTICLE) | (NOUN) | (JAPANESE PARTICLE) | (ADVERB) | (VERB) |

DEPENDENT STRUCTURE

RESULTS OF TARGET LANGUAGE GENERATION

FIG. 11 (a)

| ELEMENT TYPE (1001) | CASE INFORMATION (1002) | DICTIONARY POINTER (1003) | NUMBER OF SUBORDINATE ELEMENTS (1004) |
|---|---|---|---|
| ELEMENT TYPE | CASE INFORMATION | DICTIONARY POINTER | NUMBER OF SUBORDINATE ELEMENTS |

| 1001 | 1002 | 1003 | 1004 |
|---|---|---|---|
| PRED | - | 001 | 3 |
| NOM | K1 | 002 | 0 |
| NOM | K2 | 003 | 0 |
| ADV | K3 | 004 | 0 |

| 1006 | 1007 | 1008 | 1009 | |
|---|---|---|---|---|
| 001 | 食べる | VERB | eat | - - - |
| 002 | 私 | PRONOUN | I | - - - |
| 003 | 林檎 | NOUN | apple | - - - |
| 004 | ゆっくり | ADVERB | slowly | - - - |

FIG. 14
SOURCE TEXT:
美しい少女の母が立っている
(THE BEAUTIFUL GIRL'S MOTHER IS STANDING.)
(THE GIRL'S BEAUTIFUL MOTHER IS STANDING.)
FIG. 15 (a)
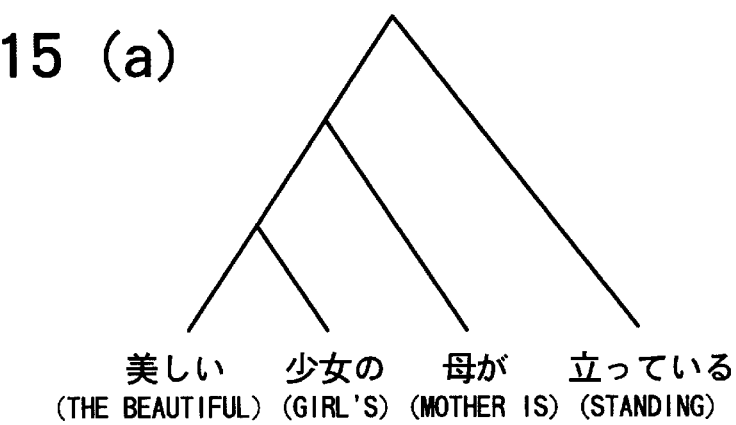
美しい　　少女の　　母が　　立っている
(THE BEAUTIFUL) (GIRL'S) (MOTHER IS) (STANDING)
FIG. 15 (b)
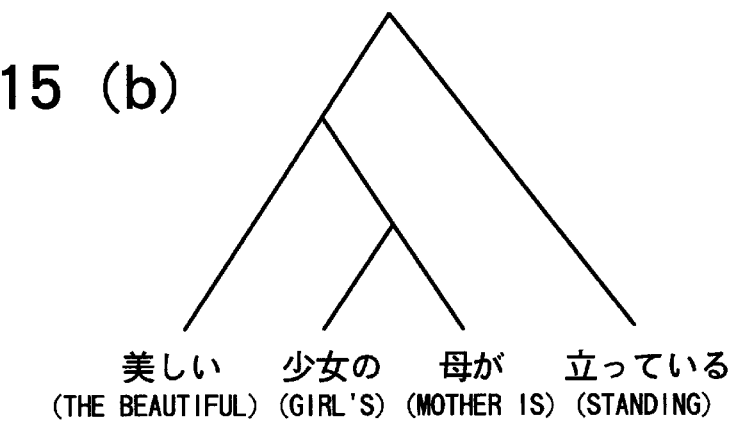
美しい　　少女の　　母が　　立っている
(THE BEAUTIFUL) (GIRL'S) (MOTHER IS) (STANDING)
FIG. 16 (a)
( (美しい　少女) の　母) が　立っている
((THE BEAUTIFUL GIRL)'S MOTHER) IS STANDING.
FIG. 16 (b)
( 美しい　　(少女の　母)) が　立っている
(THE BEAUTIFUL (GIRL'S MOTHER)) IS STANDING.

FIG. 21 (a)

```
SEARCH<CRLF>
Key-Word:<KEY WORD TO BE SEARCHED><CRLF>
Key-Language:<LANGUAGE OF KEY WORD><CRLF>
Accept-Language:<REQUESTED LANGUAGE><CRLF>
<CRLF>
<CRLF>
```

FIG. 21 (b)

```
SEARCH<CRLF>
Key-word:林檎<CRLF>
Key-Language:jp<CRLF>
Accept-Language:en<CRLF>
<CRLF>
<CRLF>
```

FIG. 23

```
(SENTENCE:
 (PRON:I)
 (VP:(VERB:eat)(ADV:slowly))
 (NP:(NUMERAL:1)(NOUN:(apple)))
)
```

SERVER DEVICE FOR MULTILINGUAL TRANSMISSION SYSTEM

BACKGROUND OF THE INVENTION

1. Field of the Invention

The present invention relates to a server device having a translation function capable of providing text data to a client device in a desired language, and also to a multilingual transmission system including the server device.

2. Description of the Related Art

The Internet is representative of a variety of popular systems enabling a user to search for data using a transmission network and then view any text data acquired as a result of the search. Such a system includes: at least one server device storing a variety of text data; at least one client device capable of displaying text data from the server device; and a transmission network connecting the server device and the client device. The transmission network can include a public telephone network, a dedicated network, or a combination of the two. The server device includes: a memory unit capable of storing a variety of text data; and a connection unit for connecting the server device to the transmission network. The client device includes: a display unit capable of displaying text data; an input unit by which text indication information can be input about text to be investigated; and a connection unit for connecting the client device to the transmission network.

An extremely large number of server devices and client devices are connected to the Internet at locations across the globs. The Internet enables users to search for and peruse a variety of information from around the world through the transmission network that connects all the different server devices and client devices.

As shown in FIG. 1, the Internet includes a plurality of server devices 2202a to 2202c and a plurality of client devices 2203a to 2203c connected to each other by a transmission network 2201. The server devices 2202a to 2202c and the client devices 2203a to 2203c will be referred to alternatively an the server device 2202 and the client device 2203 hereinafter. Each server device 2202 stores text data in a variety of different languages, such an English, Japanese, and Chinese. Each client device 2203 connected to the server devices 2202 via the transmission network 2201 is capable of displaying text data in a language particular to the client device 2203. Some of the client devices 2203 include translation programs. For example, the client device 2203b includes an English-to-Japanese translation program and the client device 2203c includes an English-to-Chinese translation program. The language translation programs translate text received from one of the server devices 2202 into a language desired by the user so that the user can read the translated text data on the display of the client device 2203.

However, in systems such an the Internet, which have a network that spans across the globs, it often happens that the native language of a provider of text data in different from the native language of a person who wishes to view the text data. Text in a foreign language in usually more difficult to understand than when it is in one's own native language.

Two methods for overcoming this problem are known. In one method, the server device 2202 stores a plurality of text data note, each in a different language, but all containing the same content. The user uses the client device 2202 to select a language he or she desires to peruse the text data in. The server device 2202 then transmits the text data in the indicated language so that the user can view the text data in his or her own language. In the second method, the client device 2203 is installed with a language translation program. Using the language translation program, the client device 2203 translates text data transmitted from the server device 2202 into a desired language. By using either of these two methods, a user can view text in his or her native language, even if it is stored in the server device 2202 in a language other than his or her native language.

SUMMARY OF THE INVENTION

However, there are problems with these two conventional methods. In the first method, wherein the server device 2202 stores a plurality of text data sets for describing the same content text in a plurality of different languages, even though all the text has the same content, there is need to prepare a plurality of text data sets describing the same content in different languages. This requires a great deal of time and effort. Also, the server device 2202 must have a large memory capacity to hold all the different sets of data.

In the second method, wherein text data is translated using a translation program, the client device 2203 must be installed with a different language translation program for each language to be translated. Because server devices 2202 provide information in a variety of different languages, the client device 2203 must be installed with a variety of different language translation programs to enable the client device 2203 to translate a variety of different languages.

For example, when the user can only read English text but wishes to read information available only in Chinese and Japanese text, the user's client device 2203 must be installed with both a Japanese-English translation program and a Chinese-English translation program, thereby increasing the cost of the client device 2203. Further, language translation programs presently available are often unable to provide desirable translation results due to vagueness included in the source text to be translated.

It is an objective of the present invention to provide a multilingual correspondence transmission system and a server device used in such a system capable of easily providing text data in a plurality of languages without requiring client devices to include a special language translation program.

A server device according to the present invention transmits desired text data to a client device according to a request from the client device. In order to achieve the above described objectives, the server device includes: a requested information reception unit that receives from the client device text identification information identifying desired text data and requested language information designating language of the desired text data; a pivot language memory that stores pivot language data expressed in a pivot language; a text retrieval unit that retrieves pivot language data from the pivot language memory based on the text identification information; a target language text generator that generates, based on the pivot language data retrieved by the text retrieval unit, target language text data in the language indicated by the requested language information; and a text transmission unit that transmits the target language text data generated by the target language text generator to the client device as the desired text data.

According to another aspect of the present invention, a multilingual transmission system includes a client device that transmits a request for desired text data and that receives the desired text data; and a server device that transmits the desired text data to the client device according to the request from the client device; wherein the client device includes: a requested information transmission unit for transmitting text identification information that identifies the desired text data and requested language information that designates language of the text data; and a reception output unit that receives the desired text data from the server device and outputs the desired text data; and wherein the server device includes: a requested information reception unit that receives the text identification information and the requested language information transmitted from the client device; a pivot language memory that stores pivot language data expressed in a pivot language; a text retrieval unit that retrieves pivot language data from the pivot language memory based on the text identification information; a target language text generator that generates, based on the pivot language data retrieved by the text retrieval unit, target language text data in the language indicated by the requested language information; and a text transmission unit that transmits the target language text data generated by the target language text generator to the client device as the desired text data.

According to still another aspect of the present invention, a server device includes a source text input unit for inputting source text data in a predetermined language; a source text analyzing unit that analyzes the source text data by meaning and grammatioal significance, the source text analyzing unit generating a plurality of candidates when vagueness in the source text data enables more than one interpretation of the source text data; and an analysis result display unit that displays the candidates generated by the source text analyzing unit.

According to another aspect of the present invention a multilingual transmission system includes: a client device; and a server device that transmits text data to the client device according to a request from the client device; wherein the client device includes: a search request transmission unit that transmits to the server device a search request containing a key word to be searched and key language information indicating language of the key word; a search result reception unit that receives a search result from the server device; and a search result output unit that outputs the search result received by the search result reception unit; and wherein the server device includes: a search request reception unit that receives the search request from the client device; a pivot language memory that stores pivot language data expressed in a pivot language; a key word conversion unit that converts the key word, based on the key language information included in the search request, into a pivot language key word expressed in the pivot language; a pivot language search unit that searches the pivot language data stored in the pivot language memory for pivot language data including the pivot language key word; and search result transmission unit that transmits search results of the pivot language search unit to the client device as the search result.

BRIEF DESCRIPTION OF THE DRAWINGS

The above and other objects, features and advantages of the invention will become more apparent from reading the following description of the preferred embodiment taken in connection with the accompanying drawings in which:

FIG. 6($a$) is a schematic representation of text identification information and requested language information transmitted from the client device to the server device;

FIG. 6($b$) is a schematic representation showing an example of the information of FIG. 6($a$);

FIG. 9($b$) shows results of a morphological analysis process performed on the sentence of FIG. 9($a$);

FIG. 9($c$) shows results of a sentence analysis process performed on the results of FIG. 9($b$);

FIG. 10($b$) is a schematic view showing results of a target language generation process performed on the dependent structure shown in FIG. 10($a$);

FIG. 11($a$) in a schematic view showing a pivot language structure data memory of the server device storing pivot language data;

FIG. 11($b$) is a schematic view showing the pivot language structure data memory of FIG. 11($a$) storing data indicating the dependent structure of FIG. 10($a$);

FIG. 11($c$) is a schematic view showing dictionary data indicated by pointers in the pivot language data of the pivot language structure data memory of FIG. 11($b$);

FIG. 14 shows an example of Japanese text containing vagueness;

FIG. 15($a$) shows a first candidate produced according to one interpretation of the Japanese text shown in FIG. 14, wherein the first candidate in displayed an an analysis tree;

FIG. 15($b$) shows a second candidate produced according to a different interpretation of the Japanese text shown in FIG. 14, wherein the second candidate is displayed as an analysis tree;

FIG. 16($a$) shows the first candidate displayed as a sentence with parentheses to indicate interrelationship of words in the sentence according to the corresponding interpretation;

FIG. 16($b$) shows the second candidate displayed as a sentence with parentheses to indicate interrelationship of words in the sentence according to the corresponding interpretation;

FIG. 21(a) is a schematic representation of a search request transmitted from the client device to the server device of the third embodiment;

FIG. 21(b) in a schematic representation showing an example of the search request of FIG. 21(a);

FIG. 23 shows an example of universal language stored as pivot language data.

DETAILED DESCRIPTION OF THE PREFERRED EMBODIMENTS

Figure 1:
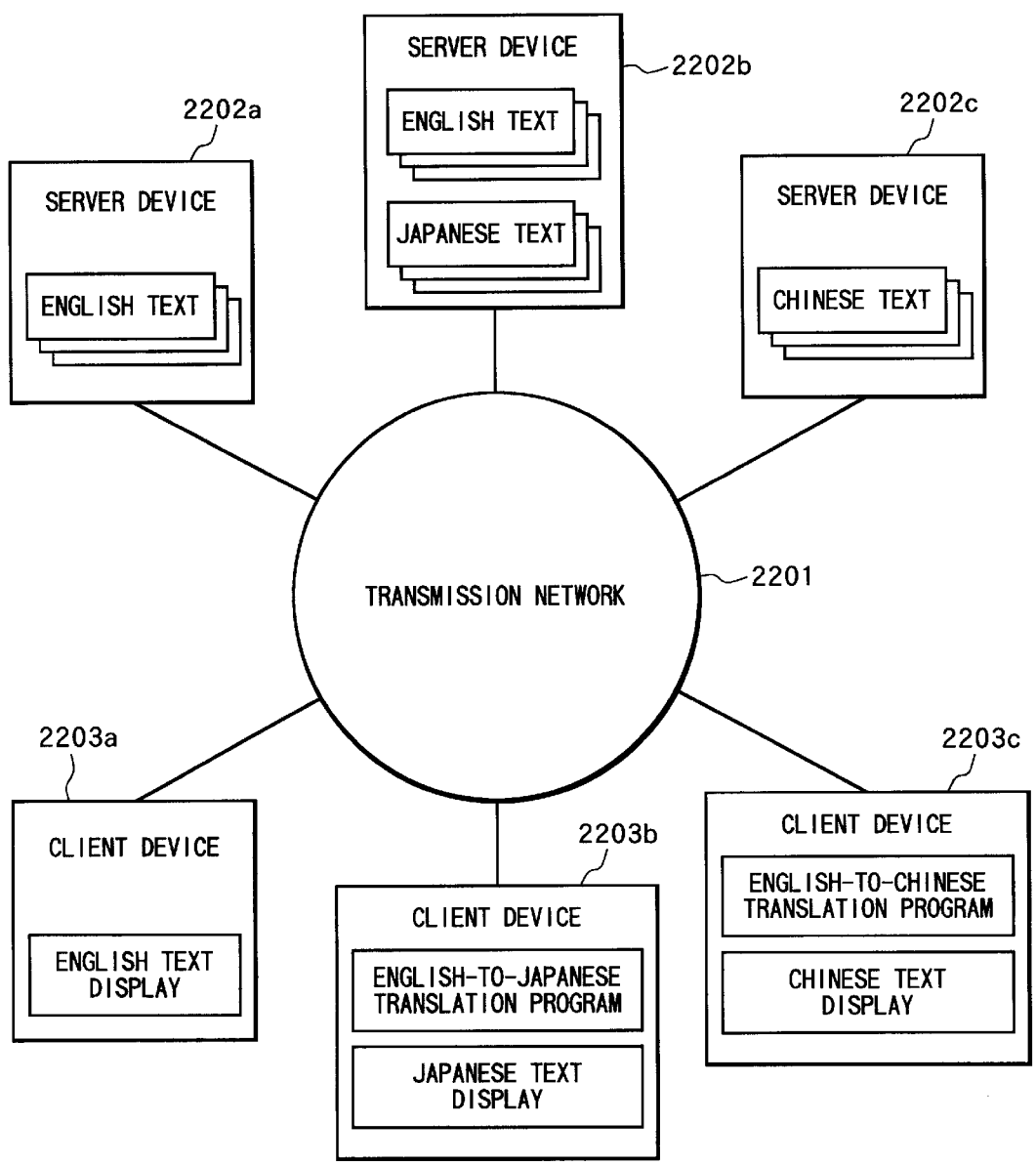
FIG. 1 is a view schematically showing a conventional transmission system.

Multilingual transmission systems according to preferred embodiments of the present invention will be described while referring to the accompanying drawings wherein like parts and components are designated by the same reference numerals to avoid duplicating description.

Figure 2:
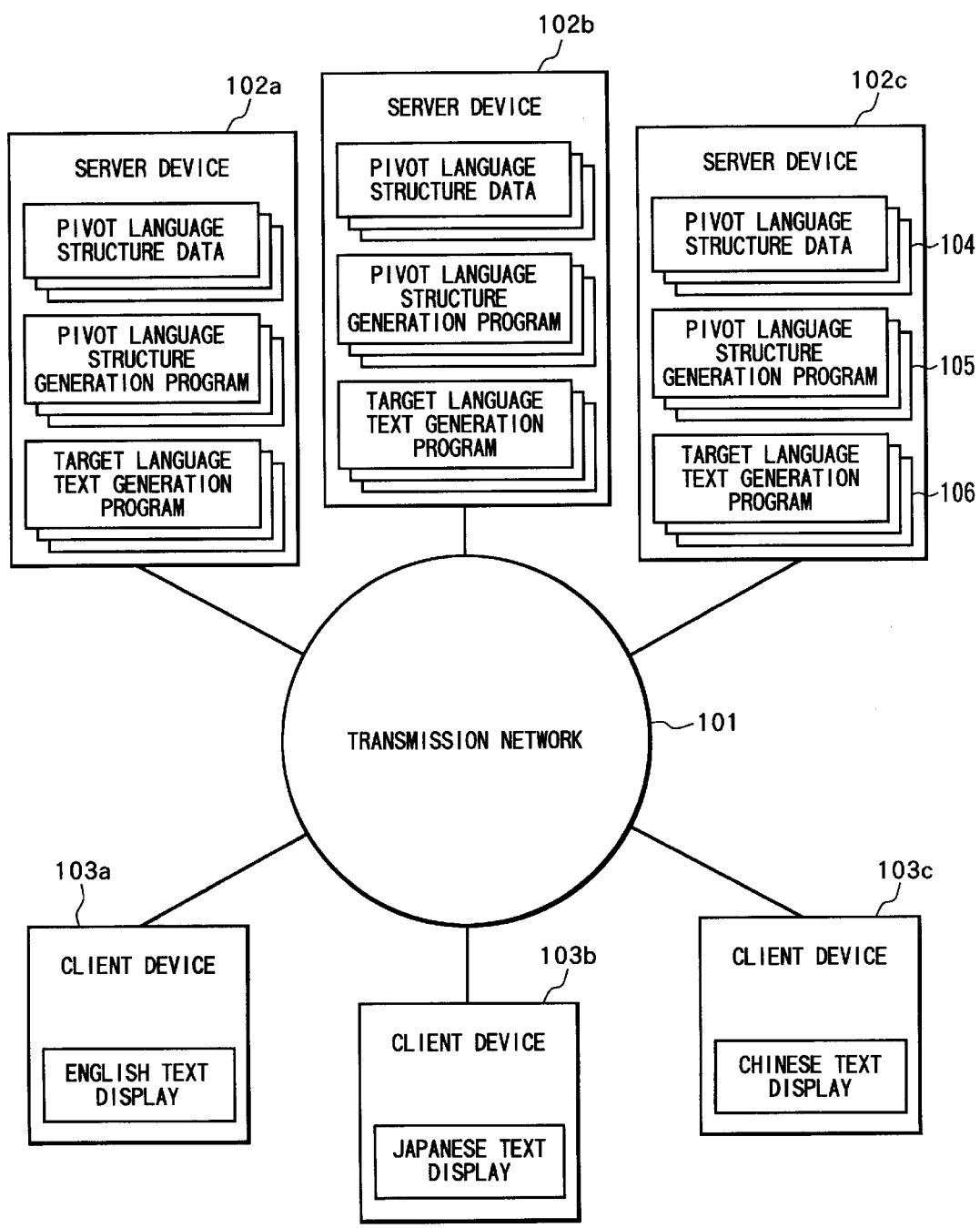
FIG. 2 is a view schematically showing a transmission system according to a first embodiment of the present invention.

FIG. 2 is a schematic depiction of a multilingual transmission system according to the present embodiment. The multilingual transmission system includes: a plurality of server devices 102a to 102c; a plurality of client devices 103a to 103c, and a transmission network 101 connecting the server devices 102a to 102c and the client devices 103a to 103c to each other. The server devices 102a to 102c will be referred to hereinafter alternatively as server devices 102 or generically an the server device 102. The client devices 103a to 103c will be referred to alternatively as client devices 103 or generically as the client device 103.

Each server device 102 stores text data in the form of pivot language structure data. As will be described in more detail later, the pivot language structure data is not similar to any particular natural language. An example of the pivot language structure data will be provided later while referring to the flowchart in FIG. 8. Each server device 102 also stores a target language text generation program for generating text data in a desired natural language, referred to as a target language, hereinafter, from the pivot language structure data.

Each client device 103 is capable of transmitting request information to a desired one of the server devices 102 via the transmission network 101. The request information includes text data indication information for indicating the text the user desires to search and language indication information for indicating which language the user desires to receive the text data in. Based on the request information transmitted from one of the client devices 103a to 103c, the server device 102 is capable of generating text data in the indicated target language from the indicated pivot language structure data stored in the server device 102. The server device 102 then transmits the generated text data in the target language to the requesting client device 103 via the transmission network 101. The client device 103 receives the text data from the server device 102 and outputs the text data as, for example, a display, a hard copy printed text, or an audio message.

Figure 3:
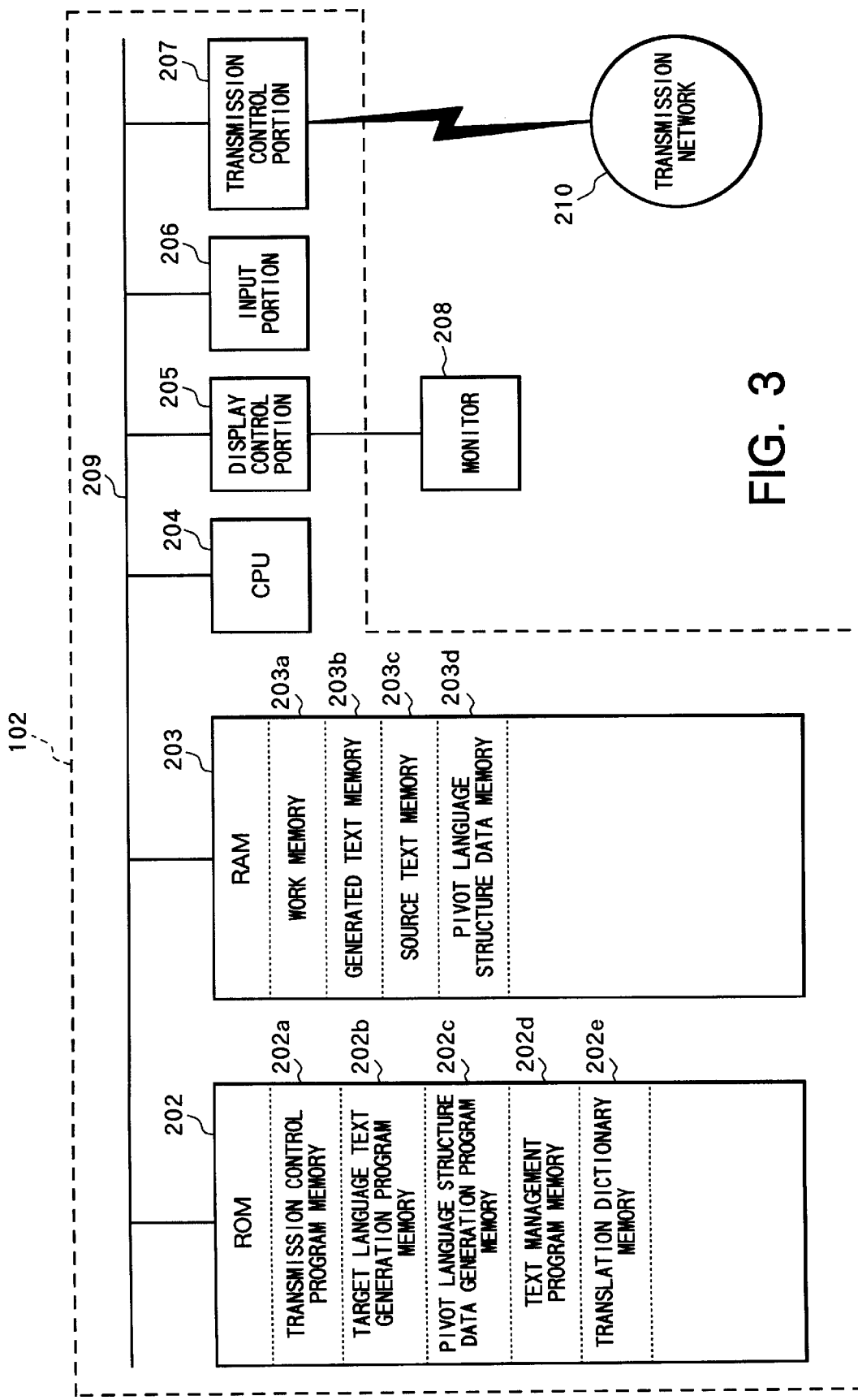
FIG. 3 is a block diagram showing components of a server device of the transmission system shown in FIG. 2.

FIG. 3 is a block drawing schematically showing internal configuration of the server device 102 according to the present embodiment.

The server device 102 includes: a ROM 202 storing a variety of programs and translation dictionary data; a RAM 203, a CPU 204 serving as a center of operations of the server device 102 for executing a variety of different control operations based on the programs stored in the ROM 202; a display control portion 205 that stores display data and outputs the display data to a monitor 208 to control display on the monitor 208; an input portion 206 that enables input of stored text data and input of commands to the server device 102; and a transmission control portion 207. A bus 209 in provided for connecting these components to each other. The monitor 208 can be any of a variety of display devices such an a CRT display or a liquid crystal display (LCD).

The transmission control portion 207 in connected to a transmission network 210, which is a portion of the transmission network 101. The transmission control portion 207 controls transmission of data between the transmission network 210 and the server device 102 in order to perform transmission and reception of data therebetween. In the present embodiment, the transmission control portion 207 is a modem for connecting the server device 102 to the transmission network 210. It should be noted that the transmission network 210 can be any network, such as a public telephone system or a dedicated circuit.

In the present embodiment, the input portion 206 is a keyboard. However, the input portion 206 can be embodied by a variety of other devices, such an a mouse or other indication device, a microphone or other voice input device, or a touch panel. The transmission control portion 207 can be embodied by a variety of different types of connection devices, such as: a wireless transmission/reception device for connecting the server device 102 to a public telephone circuit or to a dedicated circuit; a token ring connection device or a Ethernet connection device for connecting the server device 102 to a local area network (LAN); or a connection device for connecting the server device 102 to an asynchronous transfer made (ATM).

The ROM 202 includes a variety of storage areas, including a transmission control program memory 202a, a target language text generation program memory 202b, a pivot language structure generation program memory 202c, a text management program memory 202d, and a translation dictionary memory 202e. It should be noted that the ROM 202 can be replaced by a variety of memory devices other than a ROM. For example, the ROM 202 can be replaced by an electromagnetic disk, a photoelectromagnetic disk, or a CD ROM memory device.

The transmission control program memory 202a stores a transmission program for performing: control of various transmissions via the transmission control portion 207; reception of text data requests from the client device 103; and processes for transmitting text data generated therein to the client device 103.

The target language text generation program memory 202b stores a target language text generation program for generating text data in a variety of target languages from the pivot language structure data. In the present embodiment, the target language text generation program memory 202b stores a separate target language text generation program for each different target language in which text in to be generated. That is, the target language text generation program memory 202b stores at least one target language text generation program corresponding to a target language for which text is to be generated. However, it should be noted that there is no need to store a separate target language text generation program for each different target language. Instead, a single target language text generation program corresponding to all target languages can be used so that only a single target language text generation program need be stored in the target language text generation program memory 202b. Alternatively, a target language text generation program capable of generating a plurality of target languages having similar language structure can be stored and used instead.

The pivot language structure generation program memory 202c stores a pivot language structure data preparation program for initially preparing pivot language structure data based on text data in a predetermined natural language.

The text management program memory 202d stores a text management program that is central for operations to search for pivot language structure data in the pivot language structure data memory 203d, retrieve pivot language structure data from the pivot language structure data memory 203d, and store pivot language structure data into the pivot language structure data memory 203d.

The translation dictionary memory 202e stores a variety of data, such as sentence generation rule data and a morphological generation dictionary, which is necessary for performing processes of the target language text generation program. The translation dictionary memory 202e also stores a variety of data, such as a morphological analysis dictionary, sentence analysis rule data, a sentence analysis dictionary, and dependent structure rule data, which in needed for processes of the pivot language structure generation program.

The RAM 203 in used for temporarily storing a variety of types of data, such as pivot language structure data. The RAM 203 includes a work memory 203a, a generated text memory 203b, a source text memory 203c, and the pivot language structure data memory 203d. The RAM 203 need not be a RAM but could be any type of memory device, such an an electromagnetic disk or photoelectromagnetic disk device.

The work memory 203a provides temporary storage regions needed during operation of the various programs described above. The generated text memory 203b temporarily stores target language text data generated, based on pivot language structure data stored in the pivot language structure data memory 203d, by the target language text generation program stored in the target language text generation program memory 202b. The source text memory 203c stores source text data input for producing the pivot language structure data using the pivot language structure generation program. The source text data is input in a predetermined natural language via the input portion 206 and the transmission control portion 207.

The pivot language structure data memory 203d stores at least one set of pivot language structure data. It should be noted that the pivot language structure data memory 203d can be provided in the ROM 202 when the server device 102 is not configured to generate pivot language structure data.

In the present embodiment, the pivot language structure data stored in the pivot language structure data memory 203d is prepared using the pivot language structure data generation program stored in the pivot language structure generation program memory 202c so that the server device 102 prepares the pivot language structure data from source text. However, the pivot language structure data preparation program need not be stored in the server device 102 nor must the pivot language structure data be prepared in the server device 102. As an alternative, the pivot language structure data can be prepared in a separate device and then input and stored in the server device 102 afterwards.

Figure 4:
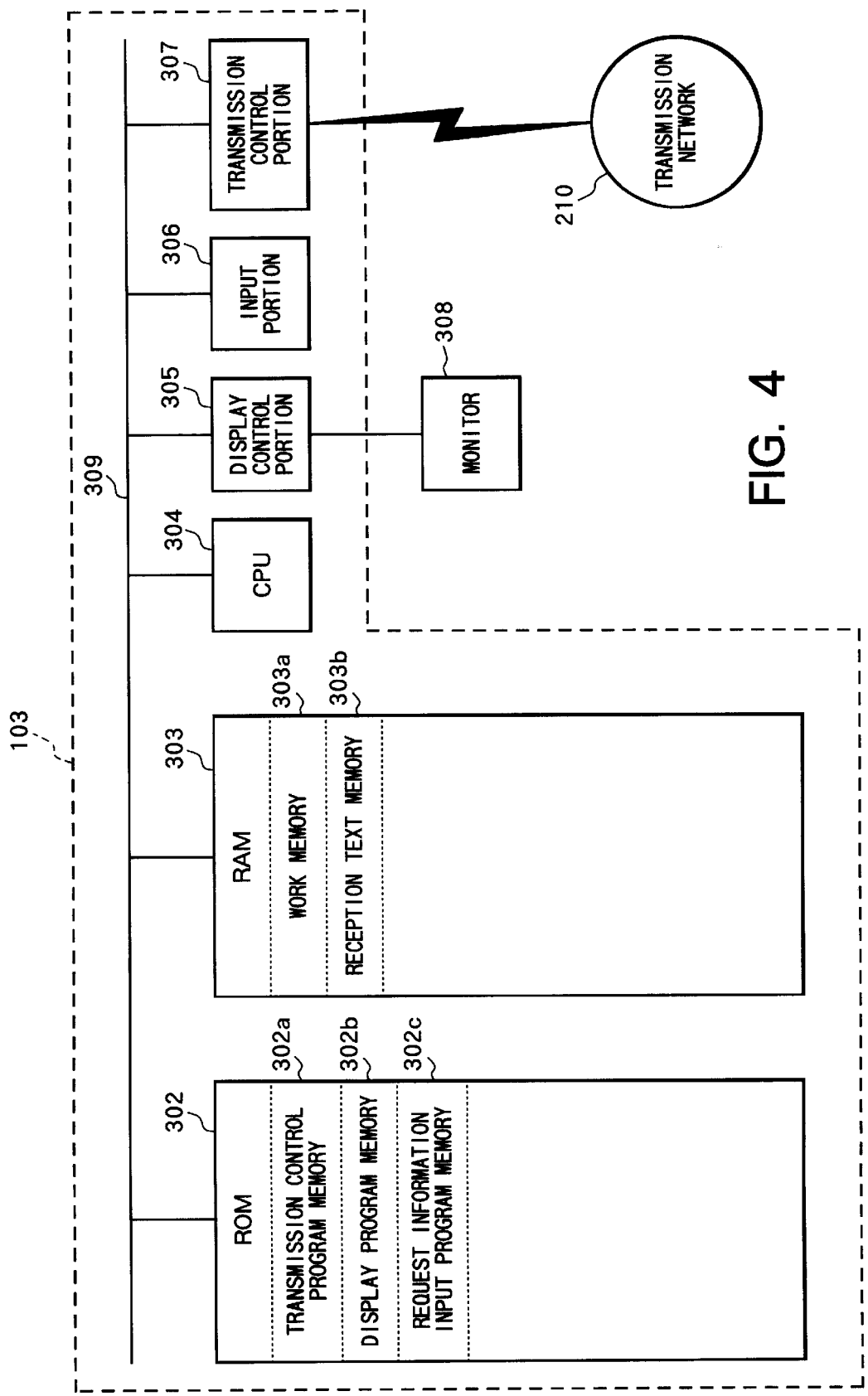
FIG. 4 in a block diagram showing components of a client device of the transmission system shown in FIG. 2.

Next, an explanation will be provided for the client device 103 while referring to FIG. 4. The client device 103 includes: a ROM 302; a RAM 303; a CPU 304 that executes a variety of controls based on a variety of stored programs and in general orchestrates operations of the client device 103; a display control portion 305 that controls a monitor 308 and controls storage of data to be displayed in order to output the data as a display on the monitor 308; an input portion 306 for inputting a variety of commands and information, such as text identification information for indicating desired text data and requested language information for indicating the desired language, to the RAM 303; and a transmission control portion 307 that connects the client device 103 to the transmission network 210. A bus 309 is provided for connecting theme components to each other.

The monitor 308 can be any of a variety of different display devices such as a cathode ray tube display or a liquid crystal display. Alternatively, the display control portion 305 and the monitor 308 can be replaced by a printer or other device for producing text data in print or a speaker or other vocal output device for producing an audio output.

Although in the present embodiment the input portion 306 in a keyboard, the input portion 306 can be embodied by a variety of other devices, such as a mouse or other indication device, a microphone or other voice input device, or a touch panel.

The transmission control portion 307 controls transmission of data between the transmission network 210 and the client device 103. The transmission control portion 307 performs transmission and reception of data and in the present embodiment is a modem for connecting the client device 103 to a telephone circuit or to a designated circuit. The transmission control portion 307 can be embodied by a variety of different types of connection devices, such as: a wireless transmission/reception device for connecting the client device 103 to a public telephone circuit or to a dedicated circuit; a token ring connection device or a Ethernet connection device for connecting the client device 103 to a local area network (LAN); or a connection device for connecting the client device 103 to an asynchronous transfer mode (ATM).

The ROM 302 stores a variety of programs and includes a variety of different storage regions, such as: a transmission control program memory 302a, a display program memory 302b, and a request information input program memory 302c. It should be noted that the ROM 302 need not be a ROM but could instead be any type of memory device such as an electromagnetic disk device, a photoelectromagnetic disk device, or a CD ROM memory device.

The transmission control program memory 302a stores a transmission control program for controlling a variety of transmissions via the transmission control portion 307 and for performing transmission and reception of data to and from the server device 102. The display program memory 302b stores a display program for using the display control portion 305 to display text data received from the server device 102. The request information input program memory 302c stores a request information input program for controlling input of request information. The request information is input by the user via the input portion 306 and includes text identification information for desired text data and language information.

The RAM 303 in used for temporarily storing a variety of different types of data and includes a variety of different memory regions, such as: a work memory 303a and a reception text memory 303b. The work memory 303a provides temporarily storage regions required during operation of the programs described above. The reception text memory 303b temporarily stores text data received from the server device 102. It should be noted that the RAM 303 need not be a RAM but could be any type of memory device such an an electromagnetic disk device or a photoelectromagnetic disk device.

Figure 5:
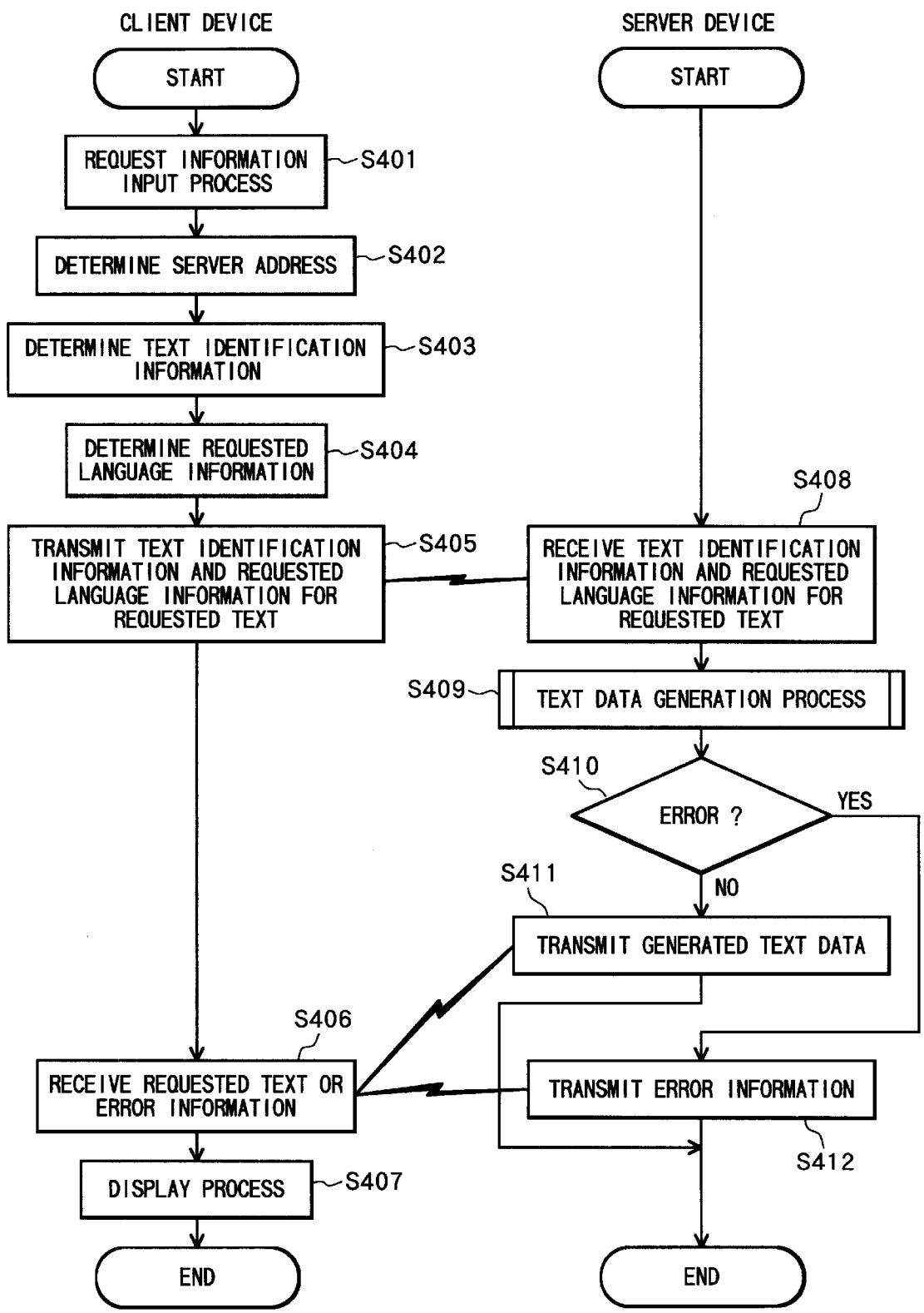
FIG. 5 is a flowchart representing processes performed by the server device and the client device.

Next, flow of basic processes of the server device 102 and the client device 103 will be described based on the flowchart shown in FIG. 5. First, in S401, the client device 103 performs a request input process wherein indication information is input for desired text data that the user wishes to obtain. Next in S402, the client device 103 determines an address for an appropriate server device 102. The address of the server device 102 is information for determining the exact location on the transmission network 101 for the target server device 102 that has the text data indicated by the input indication information. In the present embodiment, an Internet protocol address or a host name defined by transmission control protocol/Internet protocol (TCP/IP) in used as the address of the server device 102. An example for a server address in "http://sample.com". However, other information can be used instead as long an it enables determination of the address on the transmission network 101.

Next, in S403, text identification information for indicating the location of the desired text data in the server device 102 in determined based on the indication information input in S401. Then in S404, requested language information is determined for indicating what natural language the desired text data in to be in.

In S405, the client device 103 transmits text identification information and requested language information determined in S403 and S404 to the address determined in S402 for the server device 102. In the present embodiment, the information is transmitted to the server device 102 using Hypertext Transfer Protocol (HTTP) used in conjunction with TCP/IP. The above-described TCP/IP and HTTP are well-known in the art, so their explanation will be omitted here.

An example of the information transmitted in S405 is shown in FIG. 6(a) and in more concrete terms in FIG. 6(b). In FIG. 6(a): "GET" indicates that a request for data will follow; "TEXT IDENTIFICATION INFORMATION" indicates the requested data, which in this example is the text identification information determined in S402; "VERSION INFORMATION" indicates HTTP version information; "CRLF" is a new line character; "VARIOUS HEADER INFORMATION" indicates necessary header information defined by HTTP; "ACCEPT LANGUAGE" is a string of characters indicating that the following data is requested language information; "REQUESTED LANGUAGE" indicates a string of characters preset for identifying the requested language that the user wishes the desired text to be in. FIG. 6(b) shows a concrete example, wherein the text identification information is /pub/sample.html, the HTTP version is 1.0, and the requested language in Japanese.

Next, processes are performed by the server device 102 according to the information transmitted by the client device 103 in S405. First, in S408, the server device 102 receives the requested language information and the text identification information transmitted for the requested text by the client device 103 in S405. In S409, the text data generation program is executed to generate the desired text data in the desired natural language based on the received information. Details of operations performed in S409 will be explained later with reference to the flowchart shown in FIG. 7. Next, whether or not the desired text data was successfully generated into the desired natural language in S409 is judged in S410 by referring to an error flag to be described later. If no error is judged (S410:NO), then in S411, the server device 102 transmits the generated text data to the client device 103. On the other hand, when an error is judged (S410:YES), then in S412, the server device 102 transmits error information to the client device 103.

Afterward, in the client device 103, the client device 103 receives in S406 either text data or error information from the server device 102, depending on whether the server device 102 performed S411 or S412. The client device 103 then displays the received data or information on the display device in S407.

Figure 7:
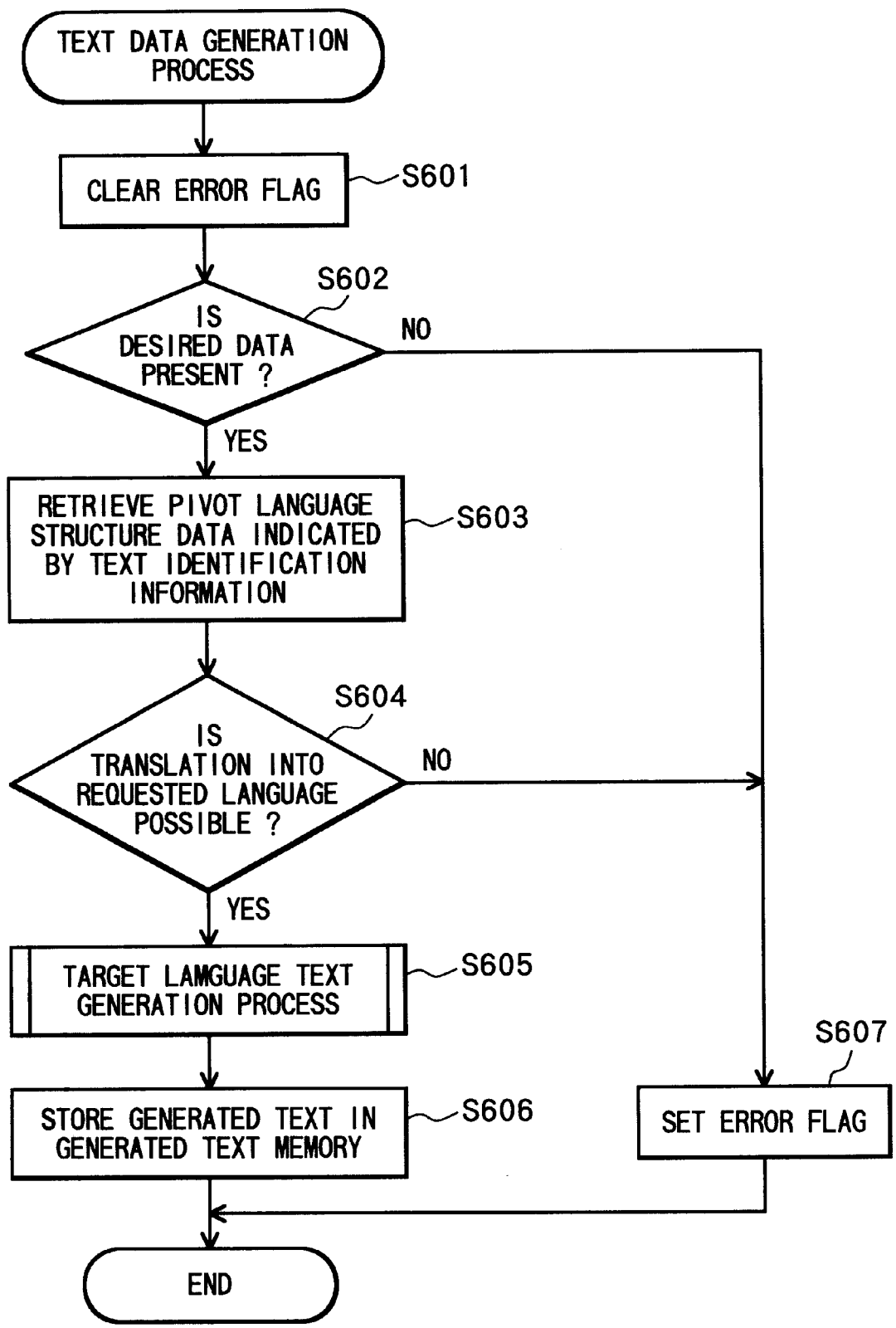
FIG. 7 is a flowchart representing a text data generation process performed by the server device.

Next, the text data generation processes performed in S409 will be discussed in detail while referring to the flowchart in FIG. 7. First in S601, an error flag is cleared, that is, reset to zero. Although not shown in the drawings, the error flag is formed in the work memory 203a and is for recording an error condition. Next, it is determined in S602 whether or not text data indicated by the text identification information exists in the server device 102. If no appropriate text data exists in the server device 102 (S602:NO), then the program proceeds to S607 whereupon the error flag in not to one to indicate that an error condition exists.

On the other hand, when appropriate text data exists in the server device 102 (S602:YES), then in S603, the text management program searches in the pivot language structure data memory 203d for pivot language structure data indicated by the text identification information transmitted from the client device 103 and then retrieves the pivot language structure data into the work memory 203a.

In the present embodiment, each set of pivot language structure data stored in the pivot language structure data memory 203d is stored in a single film. Further, file names where pivot language structure data is stored are used as the text identification information. Therefore, whether or not the desired data is present is judged in S602 depending on whether or not the file name in the text identification information indicates an existing file. When a file exists (S602:YES), then in S603, the text management program retrieves the pivot language structure data from the indicated file into the work memory 203a.

However, it should be noted that other types of text identification information can be used instead of file names. For example, a data bass management program can be used as the text management program, in which case memory regions of the database would perform the same function as pivot language structure data memory 203d. Indication information capable of pinpointing text data within the database could function am text identification information.

Next, whether or not the pivot language structure data can be translated into the target language is judged in S604 based on the requested language information received in S408. As described previously, in the present embodiment, an individual target language text generation program is provided separately for each target language. Accordingly, the judgment of S604 is performed by judging whether or not a target language text generation program which corresponds to the language indicated by the requested language information received in S408 is stored in the target language text generation program memory 202b.

When an appropriate target language text generation program in stored in the target language text generation program memory 202b (S604:YES), then in S605, a target language text generation process for generating target language text data from the pivot language structure data is executed. Details of the process performed in S605 will be described later while referring to the flowchart of FIG. 12.

Next in S606, the target language text data generated in S605 is temporarily stored in the generated text memory 203b before the target language text data in transmitted to the client device 103 in S411. It should be noted that, when an error flag for performing error processes is set to one in S607 based on negative judgments in S602 and S604, then S410 will result in a positive judgment so that error information is transmitted to the client device 103 in S412.

Figure 8:
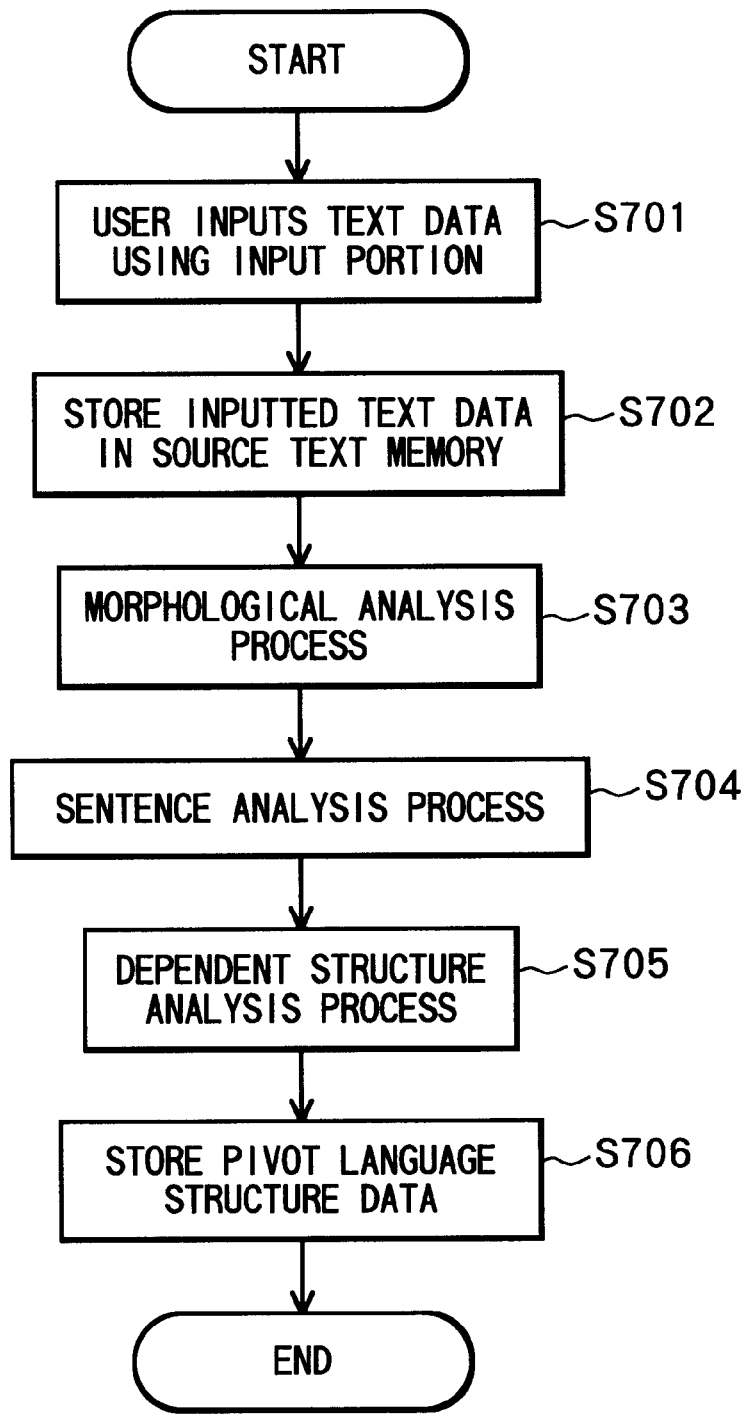
FIG. 8 in a flowchart representing a pivot language structure generation program performed by the server device.

Next, details of the pivot language structure generation program will be described while referring to the flowchart in FIG. 8. First in S701, the user uses the input portion 206 to input text data in a predetermined natural language. Next in S702, the input text data is temporarily stored in the source text memory 203c. This input text data will be processed as the source text data.

Next, in S703, the source text data is subjected to a morphological analysis process. In S703, the source text is divided into morphemes by referring to the morphological analysis dictionary stored in the translation dictionary memory 202e. The morphemes are converted into a string of morphemes and then, the grammatical type of each morpheme is determined.

Figure 9:
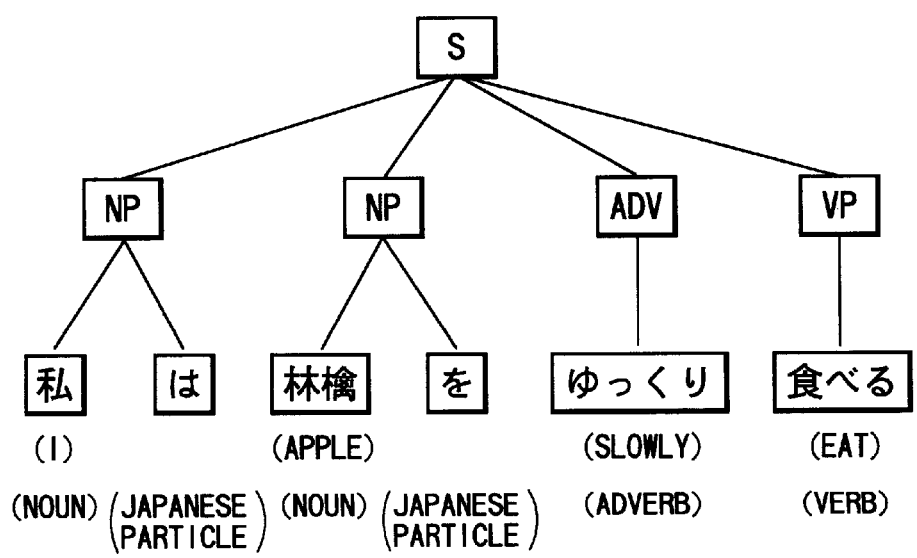
FIG. 9($a$) shows an example of text to be converted into pivot language structure data using the pivot language structure generation program represented in FIG. 8.

FIGS. 9(a) and 9(b) show an example of when a Japanese sentence is converted into pivot language structure data using the morphological analysis process performed in S703. The Japanese sentence shown in FIG. 9(a) means in English, "I eat an apple slowly." Performing the morphological analysis process on this sentence will obtain morphological analysis results made from the string of morphemes and the grammatical information shown in FIG. 9(b).

Next, a sentence analysis process is performed in S704. In order to analyze the dependency relationship between the morphemes and also to determine the role that case performs on the meaning of each morpheme, in S704 the sentence analysis rule data and the sentence analysis dictionary information stored in the translation dictionary memory 202e are applied to the string of morphemes and the grammatical type information resulting from the morphological analysis process of S703. A sentence analysis tree is produced accordingly. For example, performing the sentence analysis process of S704 on the morpheme analysis results shown in FIG. 9(b) will obtain sentence analysis results represented by the sentence analysis tree shown in FIG. 9(c). In FIG. 9(c), "S" means sentence, "NP" means noun phrase, "ADV" means adverb, and "VP" means verbal phrase.

Figure 10:
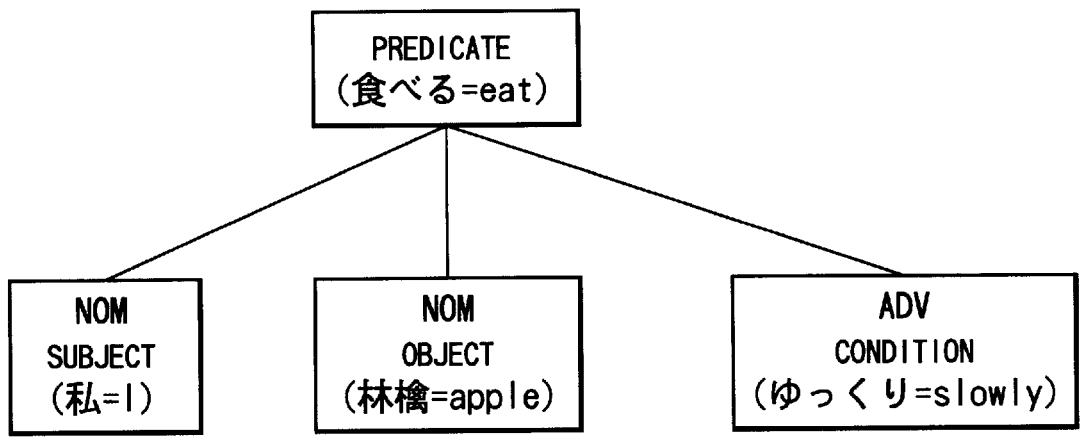
FIG. 10($a$) is a schematic view showing dependent structure resulting from the results shown in FIG. 9($c$)
Figure 10:
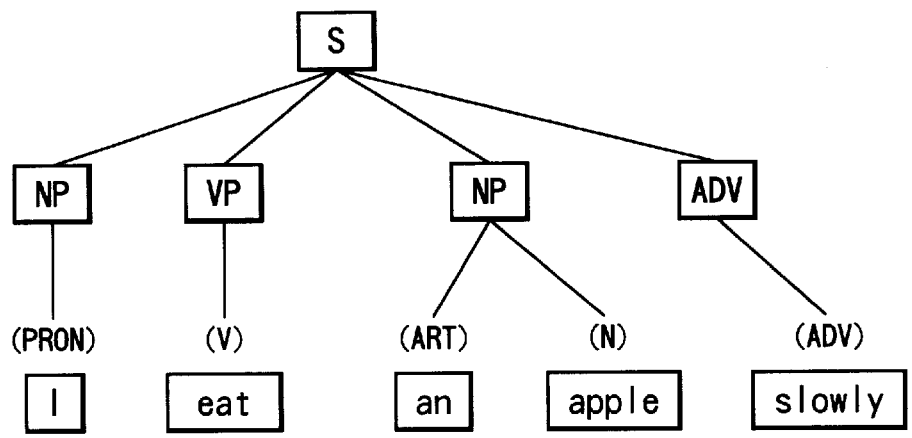

Next, the dependent sentence analysis process is performed in S705. In S705, a dependent structure, representing the relationship between the different morphemes, is formed based an the sentence analysis tree produced during the sentence analysis performed in S704. For example, when the dependent structure analysis process is performed on the sentence analysis tree shown in FIG. 9(a), then the dependent structure shown in FIG. 10(a) is obtained. In FIG. 10(a), "PRED" means predicate, "NOM" means dependent structure noun phrase, and "ADV" means adverb.

It should be noted that the morphological analysis process, the sentence analysis process, the dependent structure analysis process, the structure generation process, and the morphological generation process described in the embodiment are all well-known in the art and, for example, are disclosed in "Report Relating to Development of Language Processing Systems and Research Relating to Systems for Quickly Reporting Japanese-English Scientific Technological Documents" published by Kyoto university and the Electrotechnical Laboratory (ETL) and in Japanese Laid-Open Patent Application No. SHO-62-203273.

In S706, the dependent structure data obtained in S705 is stored in the pivot language structure data memory 203d.

In the present embodiment, dependent structure of the sentence is used to express the pivot language. That is, the pivot language structure data is formed from data obtained an a result of analyzing text in the above-described manner and representing the meaning of the text as expressed by the dependent structure. An shown FIG. 11(a), the pivot language structure data in stored as groups of elements 1005. Each element 1005 includes four categories: element type 1001, case information 1002, dictionary pointer 1003, and subordinate element number 1004.

The element type 1001 indicates, in the form of a flag setting, the type of the element in question, that is, whether the subject element is, for example, a predicate or a noun phrase. The case information 1002 stores, in the form of a flag setting, necessary information about the case of the subject element. For example, the case information 1002 stores whether the subject element is in the subjective case or the objective case, whether it indicates a condition of another element. The dictionary pointer 1003 stores a pointer indicating a dictionary data number where word information corresponding to the subject element is stored.

The subordinate element number 1004 indicates how many elements are directly subordinate to the element in question. It should be noted that the subordinate element number 1004 does not represent the entire nested condition of elements and so does not include the number of elements further subordinate to elements subordinate to the subject element. Using an analogy of a family tree, the subordinate element number 1004 only includes the number of children and not the number of grandchildren.

For example, when the dependent structure indicated in FIG. 10(a) is stored in the pivot language structure data memory 203d in S706, the pivot language structure data will appear as shown in FIG. 11(b), wherein "K1" means subjective case, "K2" means objective case, and "K3" means condition. The dictionary pointers 1003 shown in FIG. 11(b) indicate the dictionary data numbers 1006 shown in FIG. 11(c). The dictionary data stored in correspondence with the data numbers includes: words 1007 in the language used of the source text; grammatical type 1008; words 1009 corresponding to a different language from the source language, such as the target language; and further grammatical information. In the example shown in FIG. 11(c), the words 1009 are in English. In other words, the other language is English in the present embodiment.

It should be noted that pivot language data need not be formed from dependent structure data. For example, a universal language can be used an the pivot language data. A universal language is an artificially defined language. Text of universal languages can be prepared and printed out into a form readable and understandable by anyone with proper training. Examples of universal languages include Esperanto and computer program languages. Text data expressed in a universal language can be used as the pivot language data. Japanese Laid-Open Patent Application No. HEI-6-325080 describes how text in an artificially not language is used as pivot language data.

Figure 12:
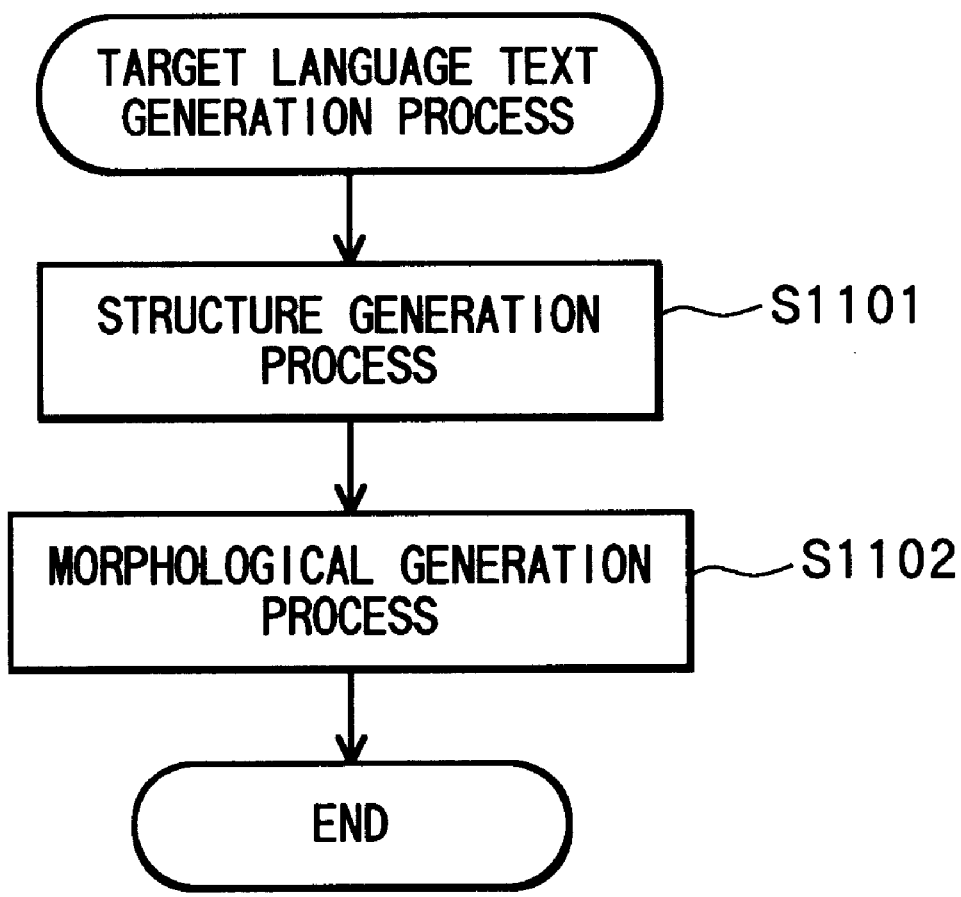
FIG. 12 is a flowchart representing flow of a target language generation process performed by the server device.

Next, while referring to FIGS. 10(a), 10(b) and 12, details of the target language text generation process performed in S705 will be explained. The target language text generation process is a process performed by the target language text generation program.

First in S1101, a structure generation process is performed on the pivot language structure data written in the work memory 203a in S706. In the structure generation process, a structure tree for the target language is generated based on the dependent structure in the pivot language structure data and while referring to the sentence generation rule data. Then, the word order is assigned.

Next, a morphological generation process is performed in S1102. During the morphological generation process, word endings of words are changed as necessary and generation of generated text data in completed. FIGS. 10(a) and 10(b) show an example of when the source text is Japanese and the target language is English. When the structure generation process and the morphological generation process are performed on a sentence with the dependent structure shown in FIG. 10(a), then the result of the target language text generation process will appear as shown in FIG. 10(b) wherein, "PRON" means pronoun, "V" means verb, "ART" means article, and "N" means noun.

In the first embodiment, text data is stored in the server device 102 not as a natural language, but instead as pivot language structure data obtained as a result of analyzing meaning and grammar of text data in a natural language. When the client device 103 requests text data, the server device 102 retrieves the corresponding pivot language structure data from its memory and generates, from the retrieved pivot language structure data, text data in the natural language requested by the client device 103. The server device 102 then transmits the generated text data to the client device.

In this way, the server device 102 can easily provide text data in a plurality of languages without requiring the client devices 103 to store a predetermined language translation program. There is also no need for the server device 102 to store text data in a plurality of languages, nor is there need for the server device 102 to store a language translation program for each different language.

Because the pivot language structure data is generated from source text data in a natural language, no special training is required of the person generating the pivot language structure data, regardless of the form of the pivot language structure data. In other words, an operator need only input text data in his or her own language to produce any type of pivot language structure data.

When an artificially defined readable language is used an the pivot language data, the pivot language data can be easily changed and managed.

Next, an explanation will be provided for a second embodiment, wherein desirable pivot language structure data can be easily generated even when the source text data from which the pivot language structure data is prepared includes vague and unclear language.

Figure 13:
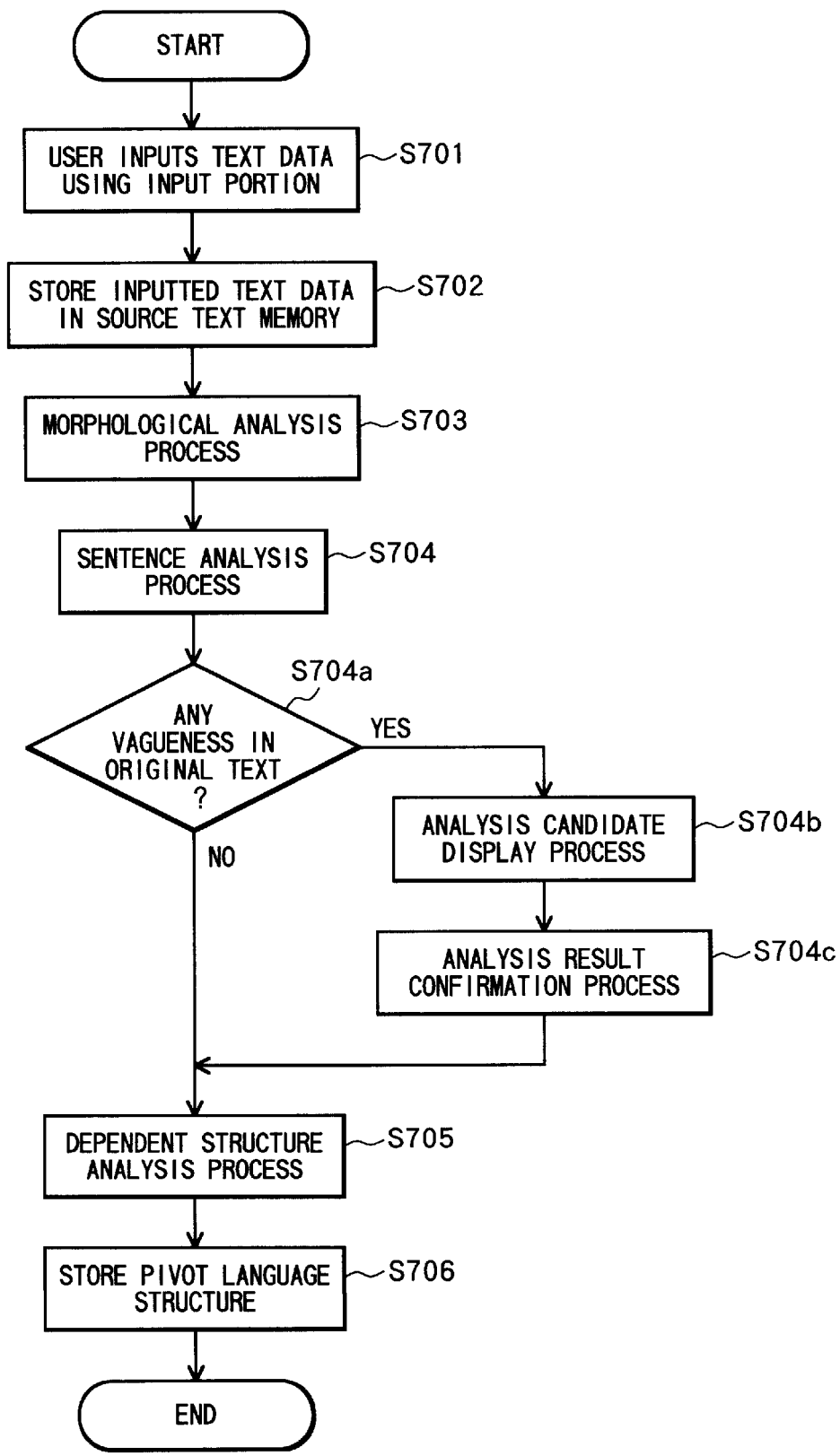
FIG. 13 is a flowchart representing flow of a pivot language structure generation program performed by a server device according to a second embodiment of the present invention.

As shown in FIG. 13, processes performed according to the second embodiment differ from those of the first embodiment by S704a to S704c. After the sentence analysis process is performed in S704, then in S704a, whether or not vagueness exists in the source text data is determined by referring to the number of sentence analysis trees generated during the sentence analysis process of S704. Vagueness is determined to be present when more than one sentence analysis tree is formed in S704. When only one sentence analysis tree is formed in S704, it is determined that no vagueness exists in the source text data.

For example, when the Japanese text shown in FIG. 9(a) is subjected to sentence analysis process in S704, only the single sentence analysis tree shown in FIG. 9(c) is formed.

In this case, it is determined in S704a that no vagueness exists in the source text data. As a result, the program will proceed to the dependent structure analysis process of S705.

On the other hand, the Japanese text shown in FIG. 14 can be interpreted in two ways: the beautiful girl's mother is standing or the girl's beautiful mother in standing. That is, the sentence in vague and does not clearly show whether the adjective "beautiful" refers to the girl or to the mother. When the vague source text data of FIG. 14 is input, then the sentence analysis process of S704 will produce the two sentence analysis trees shown in FIGS. 15(a) and 15(b).

When a plurality of sentence analysis trees are formed in this manner, then it is determined in S704a that vagueness exists in the source text so that an analysis candidate display process is performed in S704b. The analysis candidate display process is performed by the pivot language structure generation program. As a result of the analysis candidate display process, the sentence analysis trees shown in FIGS. 15(a) and 15(b) are displayed on the monitor 208 an results A and B, respectively. It should be noted that the sentence analysis trees need only show differences in the sentences resulting from the sentence analysis process. Therefore, text indicating grammatical significance such as "sentence", "phrases", and "element" are omitted an shown in FIGS. 15(a) and 15(b).

As an alternative to displaying sentence analysis trees in S704 an analysis candidates, an shown in FIGS. 16(a) and 16(b) the analysis candidates can be displayed with parentheses added to the source text data to indicate differences between the different candidates.

Next, an analysis result confirmation process is performed in S704c. The analysis result confirmation process is performed by the pivot language structure generation program. During the analysis result confirmation process, the server device 102 determines which of the results A or B the user indicates by inputting his or her decision via the input portion 206. The server device 102 then confirms the analysis result accordingly. The program then proceeds to the dependent structure analysis process of S705.

According to the second embodiment, because the analysis results are displayed on the display when vagueness exists in the source text data, the user can determine whether or not appropriate pivot language structure data will be produced or not. When vagueness exists in the source text, the user can select the most appropriate candidate from the analysis results so that accurate pivot language structure data can be easily prepared. Because the analysis results are displayed as sentence analysis trees or as text with parentheses when vagueness exists in the source text, the user can easily distinguish the difference between the different candidates.

As a result, pivot language structure data that is faithful to the intended meaning of the source text can be easily prepared, regardless of whether the source text includes vague wording. There is no need to remove vagueness from source text on which the pivot language structure data is prepared. Moreover, the target text data generated by the server device will be true to the intended meaning of the source text data from which the pivot language structure data was originally prepared.

Figure 17:
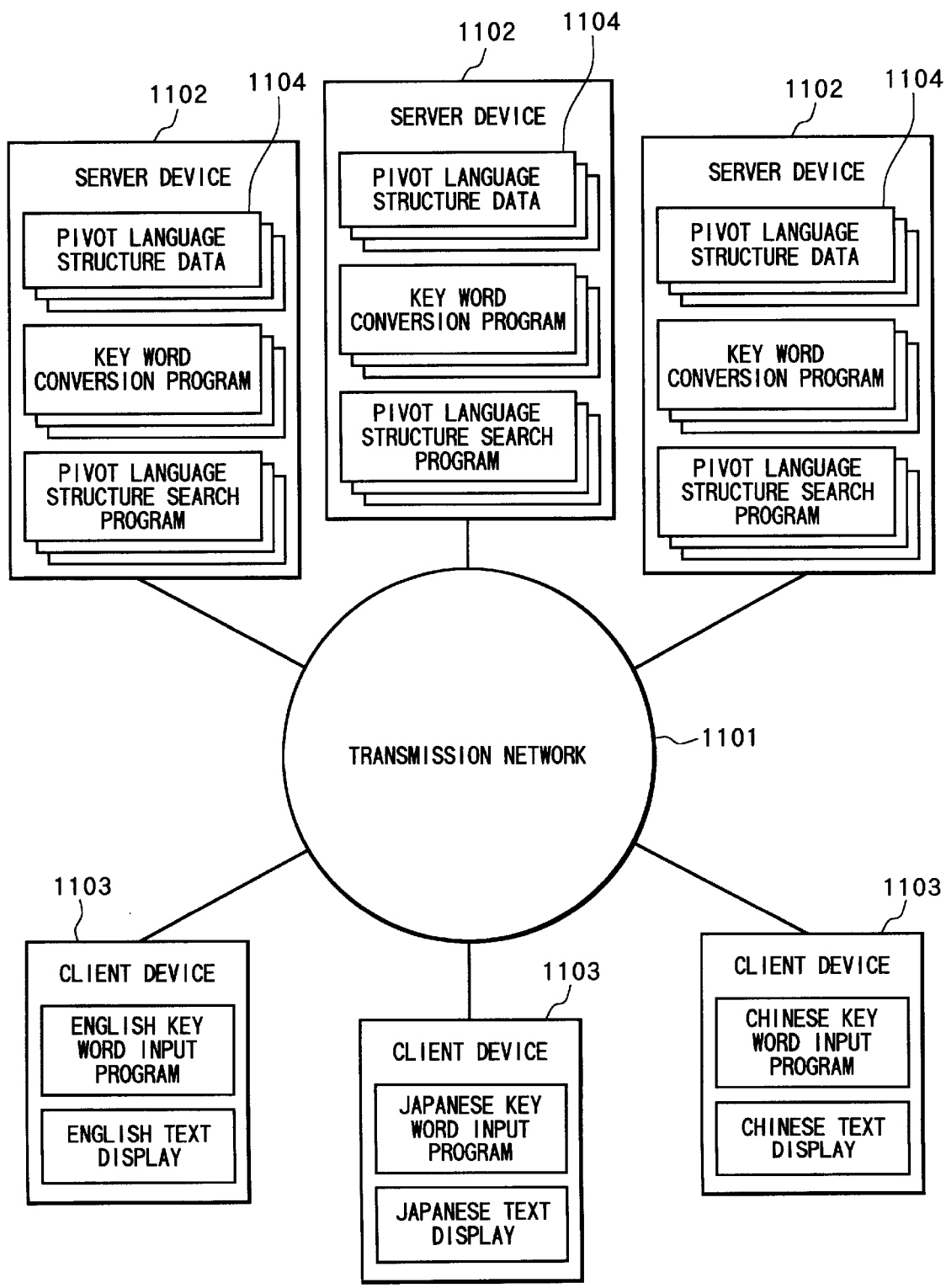
FIG. 17 is a schematic view showing a multilingual transmission system according to a third embodiment of the present invention.

Next, a multilingual transmission system according to a third embodiment of the present invention will be described. As shown in FIG. 17, the multilingual transmission system of the third embodiment includes: server devices 1102, referred to generically as server device 1102 hereinafter, and client devices 1103, referred to generically as client device 1103 hereinafter. The server device 1102 and the client device 1103 are connected by a transmission network 1101. The multilingual transmission system of the third embodiment has a search function that enables users of a client device 1103 to search for text in the server devices 1102 by using key words that the user believes will appear in the desired text. Key word an defined with respect to the present invention indicates not only words, but also characters, symbol, morphemes, phrases, sentences, or any combination of these, and also any string of characters, symbols, morphemes, phrases, or sentences.

A client device 1103 transmits a search request to a desired server device 1102 via the transmission network 1101. The search request includes a key word and key language information indicating the language of the key word. Based on the search request transmitted from the client device 1103, the server device 1102 searches in pivot language structure data 1104 for text data including the key word. The server device 1102 transmits the search results to the client device 1103 via the transmission network 1101. The client device 1103 receives the search result and outputs the search result either visually using a display or a printer, or audibly using a speaker, for example.

To accomplish this, each server device 1102 according to the third embodiment stores a key word conversion program and a pivot language structure data search program. The key word conversion program converts the key word transmitted from the client device 1103 into pivot language structure data. The pivot language structure data search program uses the pivot language key word to search for text data in the server device 1102 including the key word from the client device 1103. It should be noted that pivot language structure data of the third embodiment is produced using the processes described in the first and second embodiments. Alternatively, a universal language can be used as the pivot language data.

Figure 18:
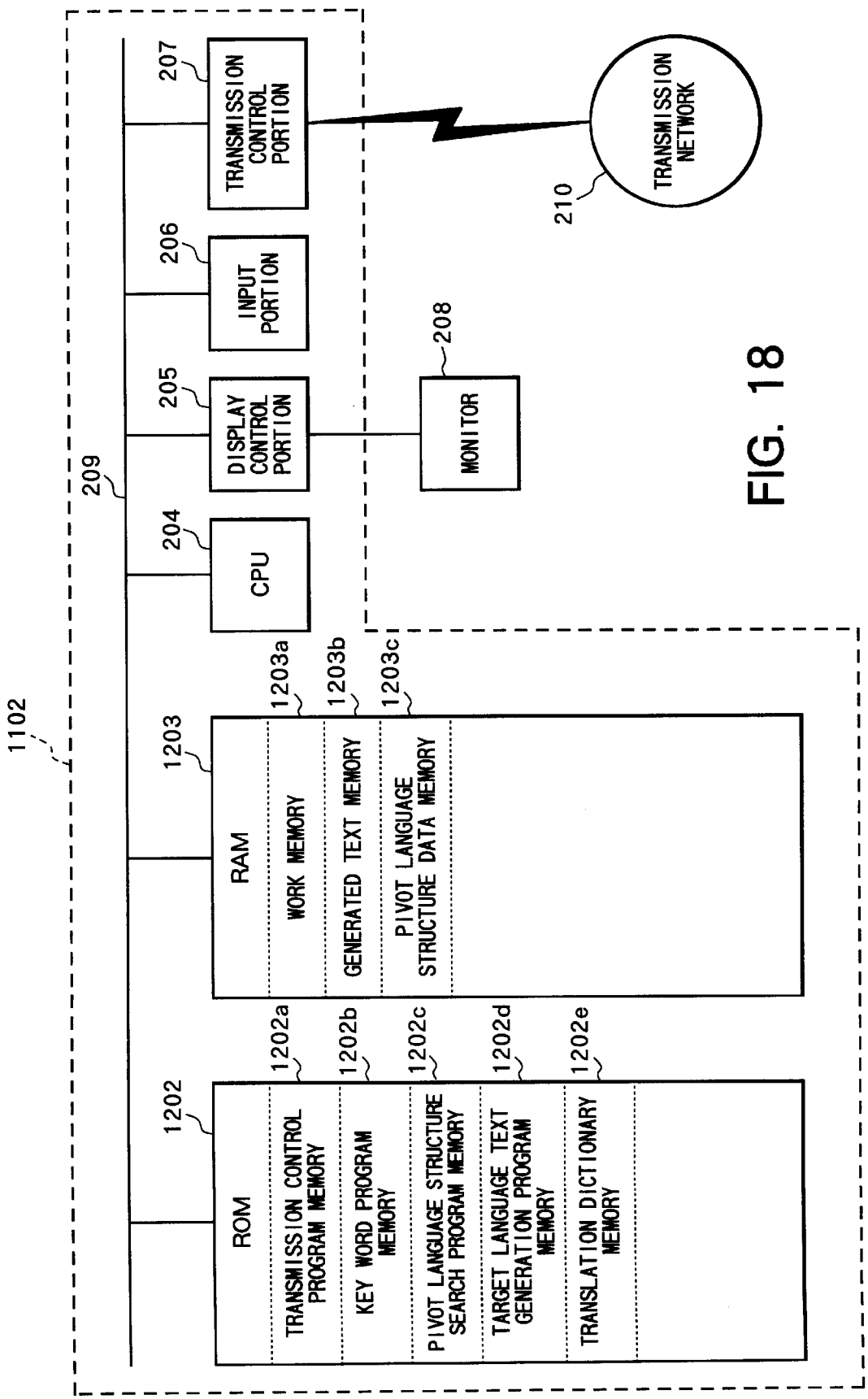
FIG. 18 is a block diagram showing a server device of the third embodiment.

As shown in FIG. 18, the server device 1102 according to the third embodiment is similar to that of the server device 1102 described in the first embodiment and includes a CPU 204, a display control portion 205, an input portion 206, and a transmission control portion 207. However, the server device 1102 includes a ROM 1202 and a RAM 1203, which are different from the ROM 202 and the RAN 203 described in the first embodiment. The ROM 1202 includes a variety of memories, such as a transmission control program memory 1202a. a key word conversion program memory 1202b, a pivot language structure search program memory 1202c, a target language text generation program memory 1202d, and a translation dictionary memory 1202e.

The transmission control program memory 1202a stores a transmission control program for performing: control of various transmissions via the transmission control portion 207, reception of search requests from the client device 1103, and transmission of search results to the client device 1103.

The key word conversion program memory 1202b stores a key word conversion program for converting a key word, that in included in the search request received from the client device 1103, into pivot language structure data. According to the third embodiment, a separate key word conversion program is required for different natural languages that the server device 1102 might receive a key word in. Therefore, in the present embodiment, the key word conversion program memory 1202b stores at least one key word conversion program for each natural language that the server device 1102 might receive key words in.

However, there is no need to provide a separate key word conversion program for each natural language of different key words. Instead, a single key word conversion program can be used that is capable of converting key words from all natural languages into pivot language structure data. In this case, only a single key word conversion program need be stored in the key word conversion program memory 1202b. Alternatively, a key word conversion program capable of converting a plurality of natural languages with similar language structure into pivot language structure data can be used and stored in the key word conversion program memory 1202b accordingly.

The pivot language structure data search program memory 1202c stores a pivot language structure data search program for searching for pivot language structure data including the pivot language key word resulting from the key word conversion program converting the key word into pivot language structure data.

The target language text generation program memory 1202d stores a target language text generation program for generating text data into a variety of different target languages from the pivot language structure data. In the third embodiment, a separate target language text data generation program is provided for each different target language for which text in to be generated, therefore at least one target language text generation program is stored in the target language text generation program memory 1202d for each different target language for which text is to be generated. However, there in no need to provide a separate target language text generation program for each target language. Instead, a single target language text generation program for all target languages can be used. In this case, a single target language text generation program can be stored in the target language text generation program memory 1202d. Alternatively, a target language text generation program capable of converting a plurality of target languages having a similar grammatical structure can be used and stored in the target language text generation program memory 1202d instead.

The translation dictionary memory 1202e stores a variety of data required for performing the processes of the target language text generation program, such as a morphological generation dictionary and sentence generation rule data for each target language. Further, the translation dictionary memory 1202e stores a variety of data, such as dictionary data, required for when processes of key word conversion program are performed.

Figure 19:
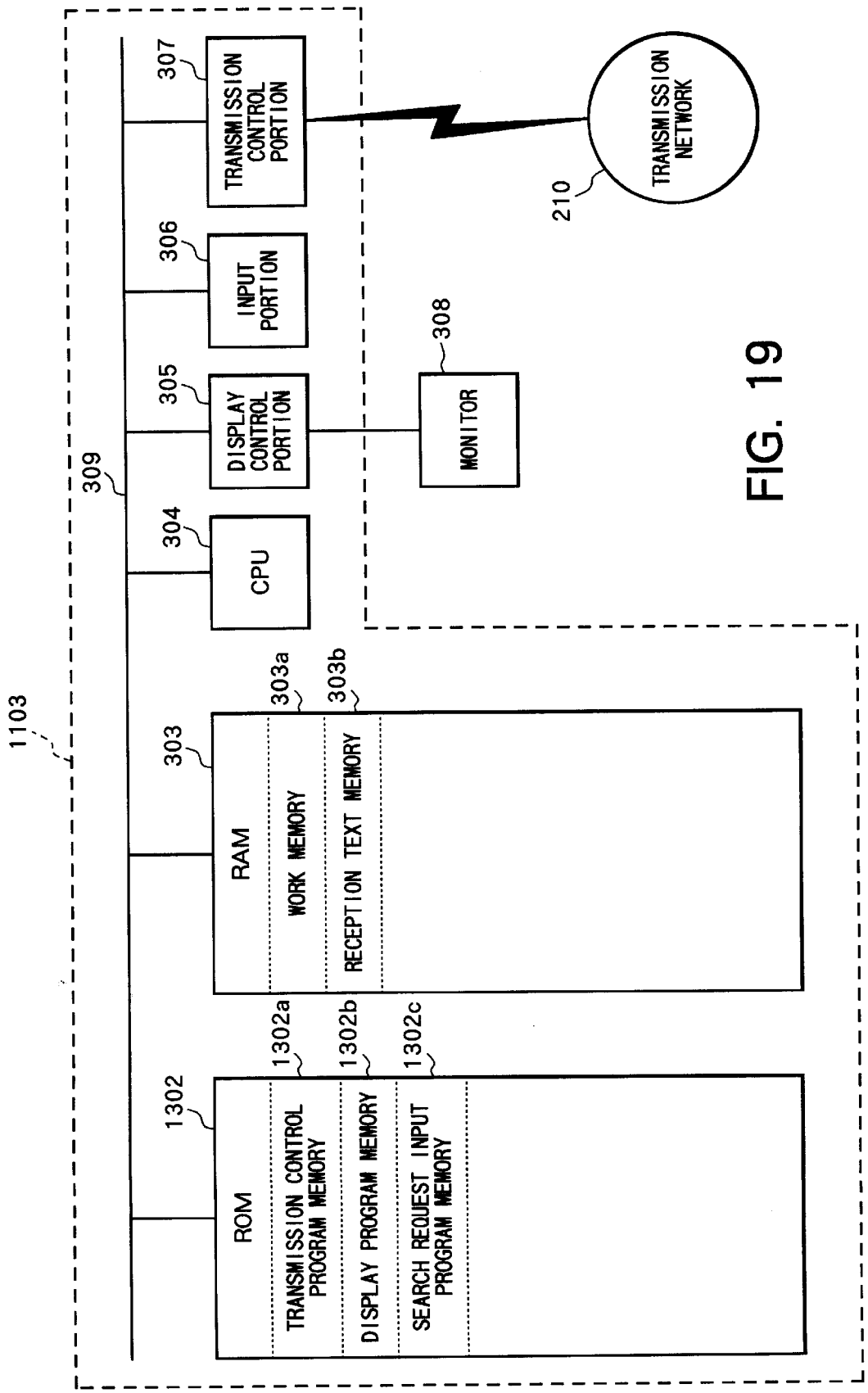
FIG. 19 is a block diagram showing a client device of the third embodiment.

As shown in FIG. 19, the client device 1103 of the third embodiment is similar to that of the client device 103 described in the first embodiment and includes: a RAM 303, a CPU 304, a display control portion 305, an input portion 306, and a transmission control portion 307. However, the client device 1103 includes a ROM 1302 that is different from the ROM 302 described in the first embodiment. Also, the input portion 306 is for inputting a variety of commands to the client device 1103 And inputting key words, for example.

The ROM 1302 includes a variety of memories, such as: a transmission control program memory 1302a, a display program memory 1302b, and a search request input program memory 1302c. The display program memory 1302b stores a display program for using the display control portion 305 to display search results received from the server device 1102. The search request input program memory 1302c stores a search request input program for enabling the user to input, via the input portion 306, a key word that the user believes will be contained in the text data he or she is seeking, the language of the key word, and the language the user wishes the text data of the search results to be in.

Figure 20:
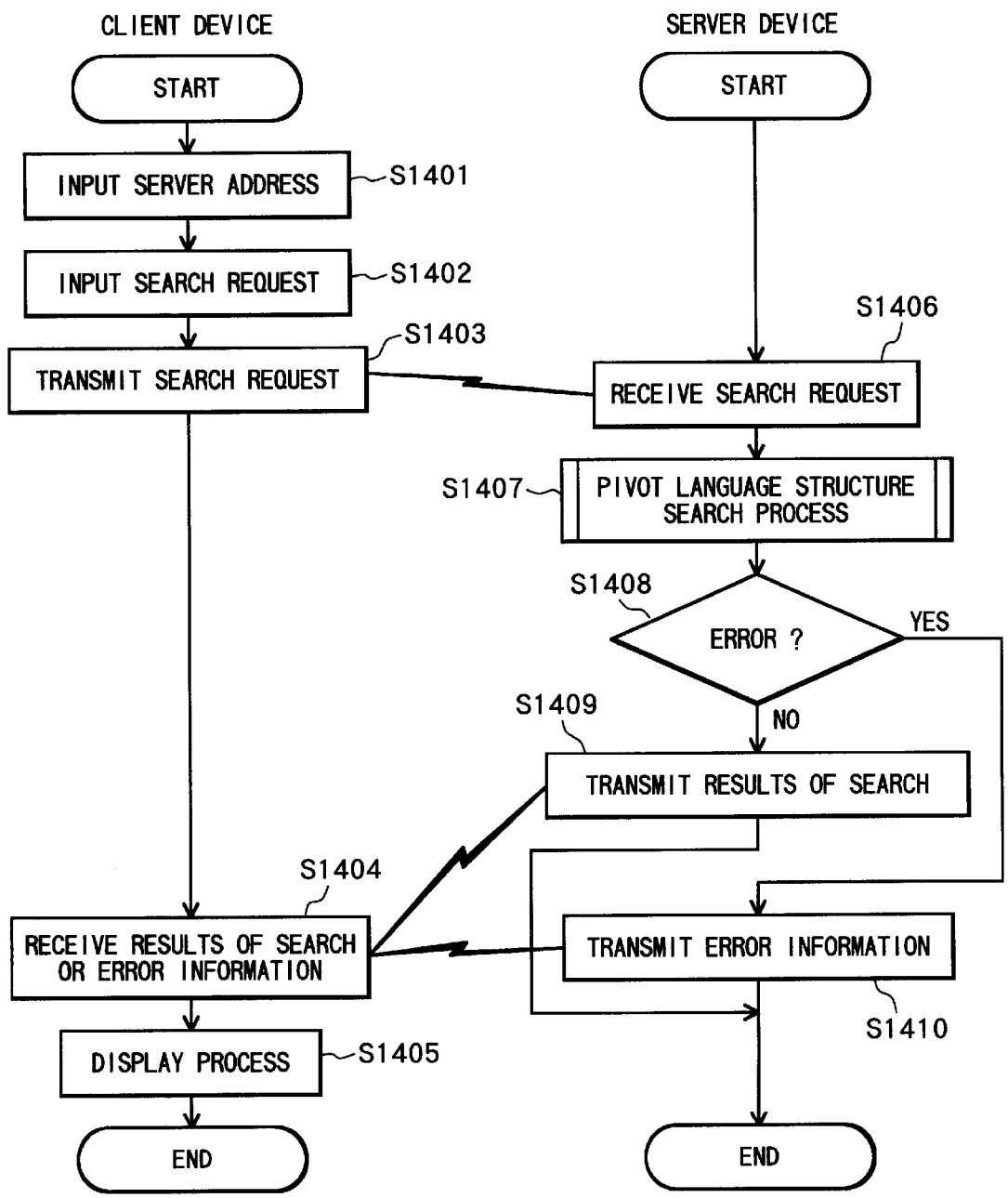
FIG. 20 is a flowchart representing processes performed by the server device and the client device according to the third embodiment.

Next, flow of basic processes performed by the server device 1102 and the client device 1103 will be explained while referring to the flowchart shown in FIG. 20.

First, the user of the client device 1103 inputs in S1401 the address of the server device 1102. Next in S1402, the user inputs a key word he or she believes will appear in the text data he or she is searching for, a key language indicating the natural language of the key word, and a target language indicating which natural language he or she wishes the text data of the search results to be in.

Next S1403, the client device 1103 transmits a search request, which includes the key word, the key language, and the target language input in S1402, to the server device 1102 at the address input in S1401. The search request is transmitted to the server device 1102 using HTTP in conjunction with TCP/IP as the transmission method for transmitting the search request to the server device 1102. In more detail, the device 1103 transmits data in the form shown in FIGS. 21(*a*) and 21(*b*), wherein "SEARCH" indicates a search request, "Key-word" indicates that a key word to be searched will follow, "KEY WORD TO BE SEARCHED" represents the key word input in S1402, "Key-Language" indicates that a string of characters indicating the key language will be inputted next, "LANGUAGE OF THE KEY WORD" is a predetermined string of characters identifying the natural language of the key word, "Accept-Language" is a string of characters defined by FTTP format that indicates the target language will be inputted next, and "LANGUAGE OF SEARCH RESULTS" indicates a predetermined string of characters identifying the target language. FIG. 21(*b*) shows an example of when the key language is Japanese, the key word is the Japanese word for apple, that is, ringo (林檎), and English is the target language.

Next, in S1406 the server device 1102 receives the key word, the key language information, and the target language in the search request transmitted from the device 1103 and S1407 executes a pivot language search process for searching in the pivot language structure data accordingly. Details of the process performed in S1407 will be explained later with reference to the flowchart of FIG. 22. Next in S1408, whether or not an error is present is judged. In the present embodiment, an error is judged in S1408 when a desired search result can not be obtained in S1407. The judgment in made by referring to an error flag to be described later. When no error is present (S1408:NO), then in S1409, a search result is transmitted to the device 1103. When an error is generated (S1408:YES), then error information in transmitted to the device 1103 in S1410. The device 1103 receives the search result or the error information from the server device 1102 in S1404 and displays the information on the display device in S1405.

Figure 22:
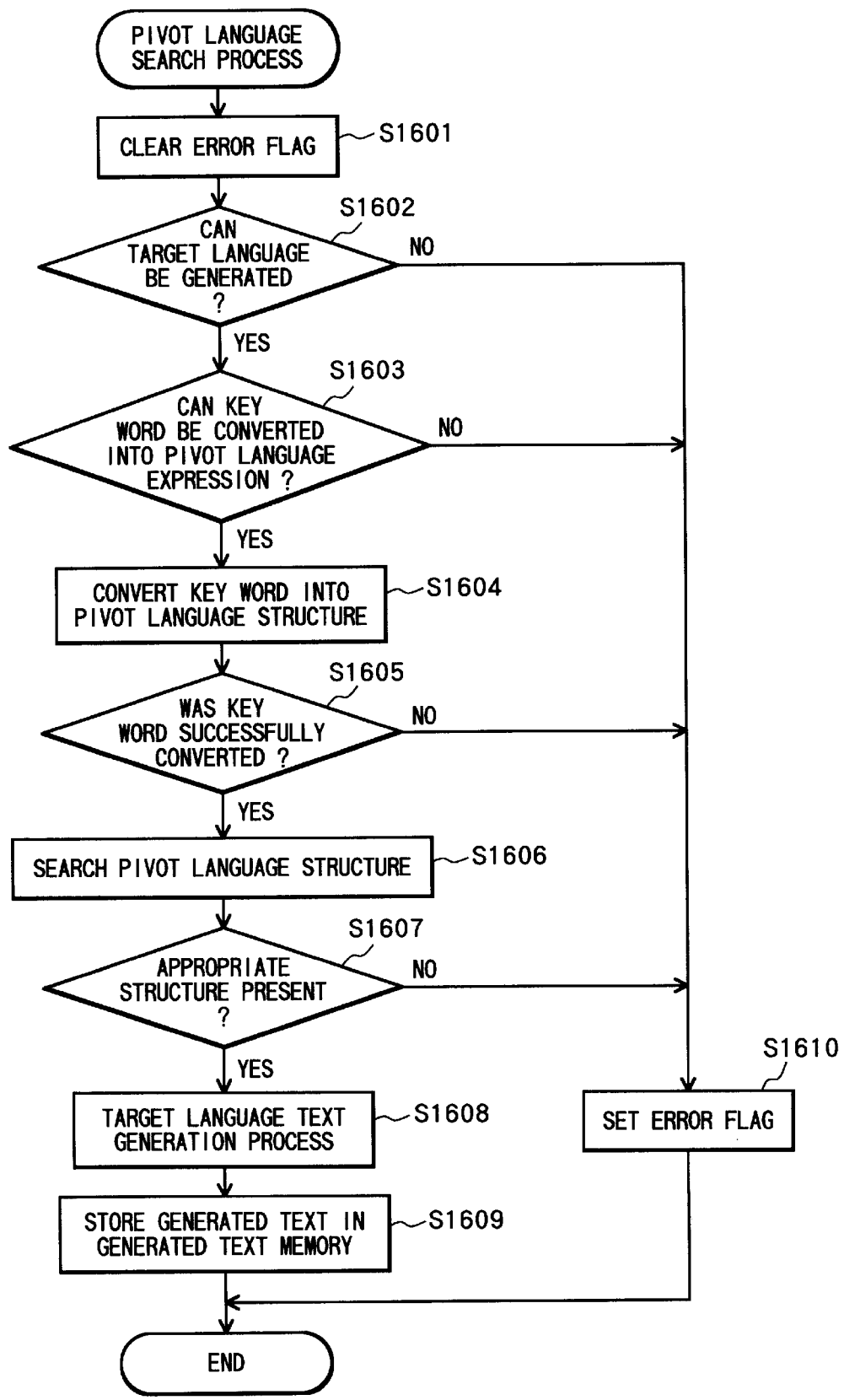
FIG. 22 in a flowchart showing a pivot language search process performed by the server device of the third embodiment.

Next, details of the pivot language search process performed in S1407 will be explained while referring to the flowchart of FIG. 22. First in S1601, the error flag formed in the work memory 1203*a* and for indicating that an error has occurred is cleared to zero so as to indicate a non-error condition.

Then in S1602, it is judged whether or not the target language received in S1406 is one that the server device 1102 can generate from pivot language structure data, assuming that the search produces results. In the present embodiment, the server device 1102 stores a separate target language text generation program for each target language. The judgment made in S1602 is performed by determining whether or not a target language text generation program corresponding to the target language received in S1406 is stored in the target language text generation program memory 1202*d*. When it is judged that generation of text data into the target language is impossible (S1602:NO), then the program proceeds to S1610 for setting the error flag because even if search results are obtained, they can not be generated in the language desired by the user. On the other hand, when it is determined that text data can be generated in the target language (S1602:YES), then the program proceeds to S1603.

In S1603, whether or not the server device 1102 is capable of converting the key word into a pivot language expression is judged based on the key language information in the search request received in S1406. In the present embodiment, the server device 1102 stores a key word conversion program for each key word in the manner described above. Therefore, the judgment in 61603 is performed by judging whether or not a key word conversion program corresponding to the key language information received in S1406 in stored in the key word conversion program memory 1202*b*. When conversion is judged impossible (S1603:NO), then the program proceeds to S1610 to set the error flag. When conversion is judged possible (S1603:YES), then the program proceeds to S1604.

In S1604, the key word in converted into pivot language structure data based on the key language information received in S1406. The process for converting the key word into the pivot language structure is performed by the key word conversion program as will be described later in detail while referring to FIGS. 11(*a*) to 11(*c*). Next in S1605, whether or not the conversion process in S1604 was successful in judged. When the conversion process is unsuccessful (S1605:NO), then the program proceeds to S1610 to set the error flag. The conversion process would be unsuccessful when no pivot language structure data exists that corresponds to the key word. On the other hand, when the conversion process is successful (S1605:YES), then the program proceeds to S1606.

In S1606, a search is performed in the pivot language structure data stored in the pivot language structure data memory portion for pivot language structure data including the pivot language key word generated in S1604. The process for searching for the pivot language key word in pivot language structure data is performed by the pivot language structure search program in a manner to be described later in detail. Next in S1607, whether or not pivot language structure data including the key word was found is judged. When no appropriate text data is found (S1607:NO), then the program proceeds to S1610. When appropriate text data is found (S1607:YES), then the program proceeds to S1608.

In S1608, target language text data in the target language indicated by target language information received in S1406 is generated from the pivot language structure data found in S1606. The target language text generation program performed in S1608 will be described in detail later. Next in S1609, the target language text data generated in S1608 is temporarily stored in the generated text memory 1203*b*. It should be noted that in S1610, an error condition is stored by setting the error flag when S1602, 1603, 1605, or 1607 results in a negative judgment.

Next, process performed in S1604 for converting the key word into the pivot language structure will be described while referring to FIGS. 11(*a*) to 11(*c*).

In the present embodiment, the pivot language structure data is expressed by the dependent structure of the corresponding text. Therefore, the key word is first searched in the dictionary data shown in FIG. 11(c). When a match is found, the data number 1006 corresponding to the match in determined. That data number will be used an the pivot language expression of the key word.

In the present example, wherein the key word is the Japanese word ringo (林檎), which mean apple, the corresponding data number 1006 is 003. Therefore, the pivot language expression for ringo (林檎) will be designated as 003.

Next, the process performed in S1606 for searching for the pivot language key word in the pivot language structure data will be explained while referring to FIGS. 11(a) to 11(c). This search process is for finding, in the pivot language structure data stored in the pivot language structure data memory 1203c, pivot language structure data that includes the pivot language expression of the key word. When the data number 1006 indicating the pivot language expression of the key word matches a dictionary pointer 1003 included in any of the structure elements 1005 of the pivot language structure data, then it can be judged that the pivot language structure data includes the key word.

When the key word ringo (林檎) is searched, because the pivot language structure data shown in FIG. 11(b) includes a dictionary pointer 1003 indicating the data number 003, which indicates the location of dictionary data for the key word ringo (林檎) as determined during the conversion into a pivot language expression in S1604, therefore the pivot language structure data shown in FIG. 11(b) is determined to include the key word ringo (林檎).

The target language character generation process performed in S1608 is similar to the target language character generation process in S605 explained in the first embodiment, although in S701, the sentence generation process is performed on the pivot language structure data searched in S1606. During the sentence generation process of S701, a sentence structure tree is generated in the target language based on the dependent structure in the pivot language structure data and then word order of the target language text is determined while referring to the sentence generation rule data.

With the system of the third embodiment, a user uses the client device 1103 to indicate a key word in a natural language to the server device 1102. The server device 1102 then searches for text data including the key word from text data stored an pivot language structure data. When the search produces results, the server device 1102 then sends the resultant text in the target language to the client device 1103.

Accordingly, a user can search for desired text data in the pivot language structure data stored in the server device 1102, without the server device 1102 first having to generate the desired text data in the target language. Because any text data that the server device 1102 provides contains information of interest to the user, the user need not determine whether or not the content of the text data is necessary by reading through all of text data first. The user can easily view only desired text data without referring to a great deal of superfluous text data.

Because the server device 1102 transmits the search results to the device 1103 in the same language as the natural language of the key word, the client device 1103 can easily output the received text data and the user can easily view the desired text data, without the need to store a language translation program in the client device 1103 or the need to store text data in a variety of languages in the server device 1102.

Because the search request from the client device 1103 includes not only a key word, but also key language information of the key word and target language information desired for the search results, the server device 1102 generates text data in the same language indicated by the target language information. In this way, the client device 1103 can easily indicate a language desired for the search results so that the server device 1102 can generate text data in the language indicated by the client device 1103.

While the invention has been described in detail with reference to specific embodiments thereof, it would be apparent to those skilled in the art that various changes and modifications may be made therein without departing from the spirit of the invention, the scope of which is defined by the attached claims.

For example, the embodiments describe subjecting the dependent structure data, which is stored as pivot language structure data, to the sentence generation process. However, the dependent structure data can first be subjected to a dependent structure transfer process before being subjected to the structure generation process. In other words, rather than using the dependent structure of the text represented by the pivot language structure data as is, first a dependent structure transfer process in performed on the pivot language structure data to convert it into the dependent structure of the target language. Then the dependent structure of the target language is used in the structure generation process.

As mentioned above, a universal language can be used as the pivot language data. FIG. 23 shows an example of universal language stored as pivot language data. The universal language shown in FIG. 23 corresponds to the results shown in FIG. 9(c).

What is claimed is:

1. A server device that transmits desired text data to a client device, provided at a location separate from the server device, according to a request from the client device, the server device comprising:

a requested information reception unit that receives from the client device text identification information identifying desired text data and requested language information designating language of the desired text data;

a pivot language memory that stores pivot language data expressed in a pivot language;

a text retrieval unit that retrieves pivot language data from the pivot language memory based on the text identification information, the retrieved pivot language data having a content that is different from a content of the text identification information;

a target language text generator that generates, based on the pivot language data retrieved by the text retrieval unit, target language text data in the language indicated by the requested language information, wherein the target language text data differs from a translation of the text identification information; and a text transmission unit that transmits the target language text data generated by the target language text generator to the client device as the desired text data.

2. A server device as claimed in claim 1, further including:

a source text input unit for performing input of source text data in a predetermined language; and a source text analyzing unit that analyzes meaning and grammatical significance of the source text data input by the source text input unit and generates pivot language data in the form of dependent structure data based on analysis of the source text.

3. A server device as claimed in claim 2, wherein the source text analyzing unit generates a plurality of candidates when vagueness in the source text data enables more than one interpretation of the source text data; and further comprising an analysis result display unit that automatically displays the plurality of candidates generated by the source text analyzing unit.

4. A server device as claimed in claim 3, further comprising an analysis result selection unit for selecting a specific one of the plurality of candidates displayed by the analysis result display unit and designating the specific one as an analysis result.

5. A server device as claimed in claim 4, wherein the analysis result display unit displays each of the plurality of candidates generated by the source text analyzing unit as a sentence structure analysis tree.

6. A server device as claimed in claim 3, wherein the analysis result display unit displays each of the plurality of candidates generated by the source text analyzing unit as a sentence structure analysis tree.

7. A server device as claimed in claim 1, wherein the pivot language data stored in the pivot language memory is expressed in an artificially defined and readable universal language.

8. A server device as claimed in claim 1, wherein the text identification information indicates a location of the desired text data in the server device.

9. A multilingual transmission system comprising:
    a client device that transmits a request for desired text data and that receives the desired text data; and
    a server device that transmits the desired text data to the client device according to the request from the client device, the server device provided at a location separate from the client device;
    wherein the client device includes:
        a requested information transmission unit for transmitting text identification information that identifies the desired text data and requested language information that designates language of the text data; and
        a reception output unit that receives the desired text data from the server device and outputs the desired text data; and
    wherein the server device includes:
        a requested information reception unit that receives the text identification information and the requested language information transmitted from the client device;
        a pivot language memory that stores pivot language data expressed in a pivot language;
        a text retrieval unit that retrieves pivot language data from the pivot language memory based on the text identification information, the retrieved pivot language data having a content that is different from a content of the text identification information;
        a target language text generator that generates, based on the pivot language data retrieved by the text retrieval unit, target language text data in the language indicated by the requested language information, wherein the target language text data differs from a translation of the text identification information; and
        a text transmission unit that transmits the target language text data generated by the target language text generator to the client device as the desired text data.

10. A multilingual transmission system as claimed in claim 9, the server device further including:
    a source text input unit for performing input of source text data in a predetermined language; and
    a source text analyzing unit that analyses meaning and grammatical significance of the source text data input by the source text input unit and generates pivot language data in the form of dependent structure data based on analysis of the source text.

11. A multilingual transmission system as claimed in claim 10, wherein the source text analyzing unit generates a plurality of candidates when vagueness in the source text data enables more than one interpretation of the source text data; and further comprising an analysis result display unit that automatically displays the plurality of candidates generated by the source text analyzing unit.

12. A multilingual transmission system as claimed in claim 9, wherein the pivot language data stored in the pivot language memory is expressed in an artificially defined and readable universal language.

13. A multilingual transmission system an claimed in claim 9, wherein:
    the requested information transmission unit of the client device transmits to the server device a search request containing a key word to be searched and key language information indicating the language of the key word;
    the requested information reception unit of the server device receives the search request from the client device;
    the server device further includes:
        a key word conversion unit that converts the key word, based on the key language information included in the search request, into a pivot language key word expressed in the pivot language; and
        a pivot language search unit that searches the pivot language data stored in the pivot language memory for pivot language data including the pivot language key word;
    the target language text generator generates target language text data based on the pivot language data searched out by the pivot language search unit;
    the text transmission unit transmits the target language text data to the server device as a search result; and
    the reception output unit of the client device receives and outputs the search result.

14. A multilingual transmission system as claimed in claim 13, wherein:
    the target language text generator generates the target language text data in the language corresponding to the key language information.

15. A multilingual transmission system as claimed in claim 13, wherein:
    the requested information transmission unit of the client device transmits the search request with target language information in addition to the key word and the key language information; and
    the target language text generator generates the target language text data in a language corresponding to the target language information.

16. A multilingual transmission system as claimed in claim 8, wherein the text identification information indicates a location of the desired text data in the server device.

17. A server device comprising:
    a source text input unit for inputting source text data in a predetermined language;
    a source text analyzing unit that analyzes the source text data by meaning and grammatical significance, the source text analyzing unit generating a plurality of candidates when vagueness in the source text data enables more than one interpretation of the source text data; and an analysis result display unit that automatically displays the plurality of candidates generated by the source text analyzing unit.

18. A server device an claimed in claim 17, further comprising an analysis result selection unit for selecting a specific one of the plurality of candidates displayed by the analysis result display unit and designating the specific one of the plurality of candidates an an analysis result.

19. A server device am claimed in claim 18, wherein the analysis result display unit displays each of the plurality of candidates generated by the source text analyzing unit as a sentence structure analysis tree.

20. A server device am claimed in claim 17, wherein the analysis result display unit displays each of the plurality of candidates generated by the source text analyzing unit as a sentence structure analysis tree.

21. A server device as claimed in claim 17, wherein the analysis result display unit displays the plurality of candidates generated by the source text analyzing unit as sentences, each sentence including parentheses for indicating the corresponding interpretation of the source text data.

22. A multilingual transmission system comprising:
a client device; and
a server device that transmits text data to the client device according to a request from the client device, the server device provided at a location separate from the client device;
wherein the client device includes:
a search request transmission unit that transmits to the server device a search request containing a key word to be searched and key language information indicating language of the key word;
a search result reception unit that receives a search result from the server device; and
a search result output unit that outputs the search result received by the search result reception unit; and wherein the server device includes:
a search request reception unit that receives the search request from the client device;
a pivot language memory that stores pivot language data expressed in a pivot language;
a key word conversion unit that converts the key word, based on the key language information included in the search request, into a pivot language key word expressed in the pivot language;
a pivot language search unit that searches the pivot language data stored in the pivot language memory for pivot language data including the pivot language key word, the pivot language search unit returning search results that include pivot language data in addition to the pivot language key word; and
a search result transmission unit that transmits search results of the pivot language search unit to the client device as the search result, wherein the search results differ from a translation of the key word.

23. A multilingual transmission system as claimed in claim 20, wherein the server device further includes a target language text generator that generates, from the pivot language data searched out by the pivot language search unit, text data in the language corresponding to the key language information; and wherein the search result transmission unit transmits the text data generated by the target language text generator to the client as the search result.

24. A multilingual transmission system an claimed in claim 22, wherein:
the search request transmission unit of the client device transmits the search request with target language information in addition to the key word and the key language information; and
the server device further includes a target language text generator that generates, from the pivot language data searched by the pivot language search unit, text data in a language corresponding to the target language information.

* * * * *